United States Patent
Aoshima et al.

(10) Patent No.: US 9,934,809 B2
(45) Date of Patent: Apr. 3, 2018

(54) MAGNETIC RECORDING MEDIUM COMPOSITION AND METHOD OF MANUFACTURING MAGNETIC RECORDING MEDIUM

(71) Applicant: FUJIFILM Corporation, Tokyo (JP)

(72) Inventors: Toshihide Aoshima, Minami-ashigara (JP); Reiko Inushima, Minami-ashigara (JP); Mika Imamura, Minami-ashigara (JP); Tatsuo Mikami, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/079,206

(22) Filed: Mar. 24, 2016

(65) Prior Publication Data
US 2016/0284450 A1 Sep. 29, 2016

(30) Foreign Application Priority Data
Mar. 25, 2015 (JP) ................. 2015-062110

(51) Int. Cl.
*G11B 5/702* (2006.01)
*G11B 5/70* (2006.01)
*G11B 5/714* (2006.01)

(52) U.S. Cl.
CPC .......... *G11B 5/7013* (2013.01); *G11B 5/7028* (2013.01); *G11B 5/714* (2013.01)

(58) Field of Classification Search
None
See application file for complete search history.

(56) References Cited

U.S. PATENT DOCUMENTS

| | | | |
|---|---|---|---|
| 4,526,837 A | 7/1985 | Ohtsuki et al. | |
| 4,683,280 A * | 7/1987 | Ukachi | C08F 299/022 528/294 |
| 5,098,982 A * | 3/1992 | Long, II | C08G 18/683 521/56 |
| 9,761,261 B2 * | 9/2017 | Aoshima | G11B 5/7021 |
| 2005/0233179 A1 * | 10/2005 | Murayama | G11B 5/738 428/840.1 |
| 2005/0238925 A1 * | 10/2005 | Murayama | B32B 27/18 428/840.1 |
| 2007/0059563 A1 * | 3/2007 | Hashimoto | G11B 5/7026 428/840.5 |
| 2010/0247880 A1 * | 9/2010 | Kano | B32B 27/28 428/209 |
| 2014/0374645 A1 | 12/2014 | Kikuchi et al. | |

FOREIGN PATENT DOCUMENTS

| | | |
|---|---|---|
| JP | 57-044223 A | 3/1982 |
| JP | 60-187926 A | 9/1985 |
| JP | 2004-067941 A | 3/2004 |
| JP | 2005-302181 A | 10/2005 |
| JP | 2015-028830 A | 2/2015 |

OTHER PUBLICATIONS

Office Action dated Aug. 8, 2017, issued by the Japanese Patent Office in counterpart Japanese Application No. 2015-062110.

* cited by examiner

*Primary Examiner* — Kevin M Bernatz
(74) *Attorney, Agent, or Firm* — Sughrue Mion, PLLC

(57) ABSTRACT

The magnetic recording medium composition contains ferromagnetic powder, binder, and a crosslinkable component selected from the group consisting of a component capable of forming a crosslinking structure by a radical reaction, a component capable of forming a crosslinking structure by an ionic reaction, and a component capable of forming a crosslinking structure by a pericyclic reaction, wherein the crosslinkable component contains at least polyester, and the polyester has a weight average molecular weight ranging from 1,000 to 20,000, as well as contains, per molecule, one or more acidic groups, and one or more reactive groups selected from the group consisting of a radical reactive group, an ionic reactive group, and a pericyclic reactive group.

20 Claims, No Drawings

MAGNETIC RECORDING MEDIUM COMPOSITION AND METHOD OF MANUFACTURING MAGNETIC RECORDING MEDIUM

CROSS-REFERENCE TO RELATED APPLICATIONS

This application claims priority under 35 U.S.C 119 to Japanese Patent Application No. 2015-062110 filed on Mar. 25, 2015. The above application is hereby expressly incorporated by reference, in its entirety.

BACKGROUND OF THE INVENTION

Field of the Invention

The present invention relates to a magnetic recording medium composition and a method of manufacturing a magnetic recording medium.

Discussion of the Background

Particulate magnetic recording media (also referred to simply as "magnetic recording media", hereinafter) are normally fabricated by coating a composition containing ferromagnetic powder and binder directly or indirectly— over another layer such as a nonmagnetic layer—on a nonmagnetic support, and as needed, carrying out a curing treatment such as heating to form a magnetic layer.

In particulate magnetic recording media, the binder has conventionally played important roles in dispersing the ferromagnetic powder, increasing the durability of the magnetic layer, and the like. To this end, various study of binders has been conducted (for example, see Japanese Unexamined Patent Publication (KOKAI) No. 2004-67941, which is expressly incorporated herein by reference in its entirety).

SUMMARY OF THE INVENTION

As described in Japanese Unexamined Patent Publication (KOKAI) No. 2004-67941, polar groups such as sulfonate groups are incorporated into the binder to enhance dispersion of the ferromagnetic powder. Polar groups are introduced into the binder to enhance dispersion by causing the binder to effectively adsorb to the surface of the ferromagnetic powder. However, as also described at paragraph 0026 in Japanese Unexamined Patent Publication (KOKAI) No. 2004-67941, the introduction of an excessive quantity of polar groups tends to compromise dispersion of the ferromagnetic powder. Accordingly, it is difficult to achieve adequate enhancement of dispersion of ferromagnetic powder by incorporating polar groups into the binder.

The use of resins with good mechanical properties as binder in the magnetic layer has been studied to increase the durability of the magnetic layer. In this regard, Japanese Unexamined Patent Publication (KOKAI) No. 2004-67941 proposes the using of a prescribed copolymer component such as an aromatic polyisocyanate to increase the concentration of polyurethane groups in order to enhance the mechanical properties of polyurethane resin employed as binder in the magnetic layer. However, as described at paragraph 0025 in Japanese Unexamined Patent Publication (KOKAI) No. 2004-67941, although the mechanical properties of the resin can improve as the concentration of urethane groups is increased in the resin employed as binder, solubility also decreases. As a result, dispersion of the ferromagnetic powder also tends to decrease. For this reason, it is stated at paragraph 0025 in Japanese Unexamined Patent Publication (KOKAI) No. 2004-67941 that the urethane group concentration should be kept within a range at which good dispersion of the ferromagnetic powder can be achieved.

Ever greater durability has been demanded of the magnetic layer in recent years. The reasons for this are demand for higher performance by the market, reduction in the particle size of the ferromagnetic powder, and the like. Examples of the performance demanded by the market in recent years are longer and more reliable continuous running with greater durability than in the past. Since the magnetic force per bit has decreased with reduction in the particle size of the magnetic powder, reading information from such bits has tended to bring the reproduction head closer to the surface of the magnetic recording medium (magnetic layer). As a result, the frequency of contact between the reproduction head and the surface of the magnetic recording medium (magnetic layer) has increased. Accordingly, magnetic recording media have come to be used in states where there is a greater tendency for the surface of the magnetic layer to be scratched than in the past.

Accordingly, it would be conceivable to enhance the mechanical properties of the resin employed as binder in the magnetic layer to enhance the durability of the magnetic layer, as has been studied in the past. However, as set forth above, the more the mechanical properties of the binder are enhanced to improve the durability of the magnetic layer, the greater the tendency of the dispersion of the ferromagnetic powder to decrease. That is, it has become difficult to achieve improved dispersion of the ferromagnetic powder in tandem with the greater improvement in durability of the magnetic layer that has been demanded in recent years by means of the binder, which has been the conventional practice.

An aspect of the present invention provides for a new means of achieving both enhanced dispersion of the ferromagnetic powder and increased durability of the magnetic layer in a magnetic recording medium.

An aspect of the present invention provides for a composition, which is a magnetic recording medium composition, and contains ferromagnetic powder, binder, and a crosslinkable component selected from the group consisting of a component capable of forming a crosslinking structure by a radical reaction, a component capable of forming a crosslinking structure by an ionic reaction, and a component capable of forming a crosslinking structure by a pericyclic reaction, wherein the crosslinkable component contains at least polyester, and the polyester (also referred to hereinafter as a "crosslinkable polyester") has a weight average molecular weight ranging from 1,000 to 20,000, as well as contains, per molecule, one or more acidic groups, and one or more reactive groups selected from the group consisting of a radical reactive group, an ionic reactive group, and a pericyclic reactive group.

Forming the magnetic layer with the above magnetic recording medium composition achieves both enhanced dispersion of magnetic powder and improved durability of the magnetic layer in a magnetic recording medium. In this regard, the present inventors presume the following.

With regard to enhancing dispersion, the acidic group that is contained in the crosslinkable polyester is thought to serve as a moiety that adsorbs to the particle surface of the ferromagnetic powder, allowing the crosslinkable polyester to effectively adsorb to the ferromagnetic powder. In addition, the polyester chain that is contained in the crosslinkable polyester can have a steric hindrance effect, preventing the aggregation of particles of ferromagnetic powder. The present inventors assume that this contributes to enhancing the dispersion of the ferromagnetic powder.

The polyester is a polymer containing polyester chain(s). In the present invention and the present specification, the term "polymer" is used with the meaning of both homopolymers, which are polymers of a polymerizable compound of a single structure, and copolymers, which are polymers of two or more polymerizable compounds with different structures. The present inventors assume that the polyester chain that is contained in the crosslinkable polyester can impart suitable extensibility to the magnetic layer (coating). More specifically, it is thought that simply increasing the strength of the magnetic layer may cause the magnetic layer to become more brittle and prone to fracturing. However, the crosslinkable polyester can impart suitable extensibility to the magnetic layer, which the present inventors presume contributes to improving the durability of the magnetic layer. Additionally, polyester having a weight average molecular weight falling within the above-stated range is thought to produce a plasticizing effect, thereby improving the brittleness of the magnetic layer. The present inventors assume that this also contributes to improving the durability of the magnetic layer.

It is assumed that the polyester that has adsorbed to the surface of the particles of the ferromagnetic powder by means of the acidic group as set forth above can crosslink by means of the reactive group present within the polyester to form a crosslinking structure, thereby increasing the coating strength of the magnetic layer. The present inventors presume that this contributes to further increasing the durability of the magnetic layer.

However, the above are merely presumptions by the present inventors, and are not intended to limit the present invention in any way.

The reason for adopting a reaction selected from the group consisting of a radical reaction, ionic reaction, and pericyclic reaction as the crosslinking reaction is that these reactions are reactions that can be started by treatments (such as heating and irradiation with light) that can be conducted in the process of manufacturing a magnetic recording medium. As is already known, a radical reaction is a reaction in which radicals participate. An ionic reaction is a reaction in which ions participate. And a pericyclic reaction is a reaction in which cyclization occurs through the orbital interaction of two π-electron systems.

In one embodiment, the crosslinkable polyester contains two or more of the reactive groups per molecule.

In one embodiment, the crosslinkable component further comprises a compound having per molecule two or more groups capable of crosslinking with the reactive group present in the above crosslinkable polyester. Such compounds will also be referred to as "crosslinking agents" hereinafter.

In one embodiment, the molecular weight of the compound (crosslinking agent) falls within a range of 100 to 5,000. In the present invention and present specification, the molecular weight of polymer refers to the weight average molecular weight. The weight average molecular weight will be described in greater detail below.

In one embodiment, the compound (crosslinking agent) contains per molecule 3 to 8 of the groups that are capable of crosslinking with the reactive group that is present in the crosslinkable polyester.

In one embodiment, the crosslinkable component contains binder (also referred to as a "crosslinkable binder", herein-after) containing per molecule one or more groups capable of crosslinking with the reactive group that is present in the crosslinkable polyester.

In one embodiment, the crosslinkable polyester is selected from the group consisting of the polyester denoted by formula 1 and the polyester denoted by formula 2 below.

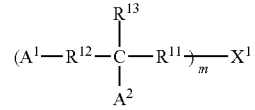

Formula 1

In formula 1, $A^1$ denotes a monovalent group containing a polyester chain and the above reactive group. Each of $R^{11}$ and $R^{12}$ independently denotes a single bond or a divalent connecting group. $R^{13}$ denotes a hydrogen atom or a monovalent group and m denotes an integer of greater than or equal to 2. The multiple instances of each of $A^1$, $R^{11}$, $R^{12}$, and $R^{13}$ that are present can be identical or different. $A^2$ denotes a hydroxyl group or a monovalent group denoted by —O—$R^{14}$—$Z^1$. $R^{14}$ denotes a single bond or a divalent connecting group. $Z^1$ denotes an acidic group. At least one of the multiple instances of $A^2$ that are present denotes a monovalent group denoted by —O—$R^{14}$—$Z^1$. $X^1$ denotes a connecting group of valence m.

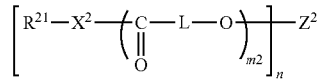

Formula 2

In formula 2, $R^{21}$ denotes the reactive group. $X^2$ denotes —O—, —S—, or —$NR^{22}$—. $R^{22}$ denotes a hydrogen atom or a monovalent group. L denotes a divalent connecting group. $Z^2$ denotes a partial structure of valence n containing at least one acidic group, m2 denotes an integer of greater than or equal to 2, and n denotes an integer of greater than or equal to 1.

In one embodiment, the polyester contains one or more radical reactive groups per molecule selected from the group consisting of a (meth)acrylic group, a (meth)acryloyloxy group, a styryl group, a vinyl group, and an allyl group.

In one embodiment, the crosslinkable polyester contains per molecule one or more ion reactive group selected from the group consisting of a carbamate group, a hydroxyl group, a mercapto group, an aldehyde group, an acetal group, an epoxy group, a (meth)acrylic group, a (meth)acryloyloxy group, a methylol group, a methoxymethyl group, a styryl group, a maleimide group, and an amino group. In the present invention and the present specification, the term "amino group," unless specifically stated otherwise, is used with a meaning that includes primary amino groups, secondary amino groups, and tertiary amino groups.

In one embodiment, the crosslinkable polyester contains per molecule one or more pericyclic reactive groups selected from the group consisting of a conjugated diene-containing group and a double bond-containing group. The term "conjugated diene-containing group" refers to a group containing a structure (conjugated diene structure) in which two double bonds are connected by one single bond. The term "double bond-containing group" is a group containing one or more double bonds. When two or more double bonds are contained, it is possible to contain, or not contain, a conjugated diene structure.

In one embodiment, the double bond-containing group is a maleimide group.

In one embodiment, the polyester contains an acidic group selected from the group consisting of a carboxyl group and a carboxyl salt. The "carboxy (salt) group" referred to further below are used with a meaning that includes both a carboxyl group and a carboxy salt.

In one embodiment, the crosslinkable polyester contains at least two acidic groups, and the number of acidic group bonded to each of two adjacent carbon atoms is respectively one.

In one embodiment, the polyester has the following partial structure:

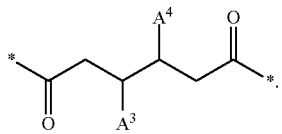

In the above partial structure, each of $A^3$ and $A^4$ independently denotes an acidic group, and * denotes the position of a bond with another structure constituting the crosslinkable polyester.

In one embodiment, * in the above partial structure denotes the position of a bond with a polyester chain contained in the crosslinkable polyester.

In one embodiment, the average particle size of the ferromagnetic powder is greater than or equal to 10 nm but less than or equal to 50 nm.

A further aspect of the present invention relates to a method of manufacturing a magnetic recording medium having a magnetic layer on a nonmagnetic support, containing:

forming the magnetic layer through a step of heating the above magnetic recording medium composition.

A further aspect of the present invention relates to a magnetic recording medium manufactured by the above manufacturing method.

An aspect of the present invention can make it possible to achieve both enhanced dispersion of ferromagnetic powder and improved durability of the magnetic layer.

Other exemplary embodiments and advantages of the present invention may be ascertained by reviewing the present disclosure.

DETAILED DESCRIPTION OF THE EMBODIMENTS

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description making apparent to those skilled in the art how several forms of the present invention may be embodied in practice.

Magnetic Recording Medium Composition

An aspect of the present invention relates to a magnetic recording medium composition, which contains ferromagnetic powder, binder, and a crosslinkable component selected from the group consisting of a component capable of forming a crosslinking structure by a radical reaction, a component capable of forming a crosslinking structure by an ionic reaction, and a component capable of forming a crosslinking structure by a pericyclic reaction, wherein the crosslinkable component contains at least polyester, and the polyester has a weight average molecular weight ranging from 1,000 to 20,000, as well as contains, per molecule, one or more acidic groups, and one or more reactive groups selected from the group consisting of a radical reactive group, an ionic reactive group, and a pericyclic reactive group.

The term "magnetic recording medium composition" is a composition that can be used to manufacture a particulate magnetic recording medium. Since the magnetic recording medium composition contains ferromagnetic powder, it can be used as the magnetic layer-forming composition of the particulate magnetic recording medium. The term "magnetic recording medium composition" will also be referred to as the "composition", hereinafter.

In the present invention and the present specification, when referring to a numeric range, the word "to" indicates a range that includes the preceding and succeeding numeric values as minimum and maximum, respectively.

Unless specifically stated otherwise, any group that is referred to can be substituted or unsubstituted. When a given group contains one or more substituents, examples of the substituents are alkyl groups (such as alkyl groups having 1 to 6 carbon atoms), hydroxyl groups, alkoxy groups (such as alkoxy groups having 1 to 6 carbon atoms), halogen atoms (such as fluorine atoms, chlorine atoms, and bromine atoms), cyano groups, amino groups, nitro groups, acyl groups, and carboxy (salt) groups. When a substituent is present, the number of carbon atoms refers to the number of carbon atoms of the portion excluding the substituent.

In the present invention and present specification, the term "ferromagnetic powder" means an aggregation of multiple ferromagnetic particles. The term "aggregation" is not limited to a form in which the constituent particles are in direct contact, and includes forms in which binder, additives, and the like are present between the particles. The same applies to other powders, such as the nonmagnetic powder.

The average particle size of the powder in the present invention and the present specification is a value that is measured by the following method with a transmission electron microscope.

Powder is photographed at a magnification of 100,000-fold with a transmission electron microscope, and the photograph is printed on print paper at a total magnification of 500,000-fold to obtain a photograph of the particles constituting the powder. A target particle is selected from the photograph of particles that has been obtained, the contour of the particle is traced with a digitizer, and the size of the (primary) particle is measured. The term "primary particle" refers to an unaggregated, independent particle. The above measurement is conducted on 500 randomly extracted particles. The arithmetic average of the particle size of the 500 particles obtained in this manner is adopted as the average particle size of the powder. A Model H-9000 transmission electron microscope made by Hitachi can be employed as the above transmission electron microscope, for example. The particle size can be measured with known image analysis software, such as KS-400 image analysis software from Carl Zeiss.

In the present invention and the present specification, the average particle size of the powder is the average particle size as obtained by the above method, unless specifically stated otherwise. The average particle size indicated in Examples further below was obtained using a Model H-9000 transmission electron microscope made by Hitachi and KS-400 image analysis software made by Carl Zeiss.

In the present invention and the present specification, the size of the particles constituting powder (referred to as the "particle size", hereinafter) is denoted as follows based on the shape of the particles observed in the above particle photograph:

(1) When acicular, spindle-shaped, or columnar (with the height being greater than the maximum diameter of the bottom surface) in shape, the particle size is denoted as the length of the major axis constituting the particle, that is, the major axis length.
(2) When plate-shaped or columnar (with the thickness or height being smaller than the maximum diameter of the plate surface or bottom surface) in shape, the particle size is denoted as the maximum diameter of the plate surface or bottom surface.
(3) When spherical, polyhedral, of unspecific shape, or the like, and the major axis constituting the particle cannot be specified from the shape, the particle size is denoted as the diameter of an equivalent circle. The term "diameter of an equivalent circle" means that obtained by the circle projection method.

The "average acicular ratio" of a powder refers to the arithmetic average of values obtained for the above 500 particles by measuring the length of the minor axis, that is the minor axis length, of the particles measured above, and calculating the value of the (major axis length/minor axis length) of each particle. The term "minor axis length" refers to, in the case of the particle size definition of (1), the length of the minor axis constituting the particle; in the case of (2), the thickness or height, and in the case of (3), since the major axis and minor axis cannot be distinguished, (major axis length/minor axis length) is deemed to be 1 for the sake of convenience.

When the particle has a specific shape, such as in the particle size definition of (1) above, the average particle size is the average major axis length. In the case of (2), the average particle size is the average plate diameter, with the average plate ratio being the arithmetic average of (maximum diameter/thickness or height). For the definition of (3), the average particle size is the average diameter (also called the average particle diameter).

For those present in a powder form, the average particle size and the like set forth above can be measured by observing the powder by a transmission electron microscope. For those contained in the magnetic layer and the like of the magnetic recording medium, the method described in paragraph 0015 of Japanese Unexamined Patent Publication (KOKAI) No. 2011-048878, which is expressly incorporated herein by reference in its entirety, for example, can be employed as the method of collecting sample powder from the magnetic recording medium for particle size measurement.

The magnetic recording medium composition according to an aspect of the present invention will be described in greater detail below.

<Crosslinkable Component>

The above composition contains a crosslinkable component selected from the group consisting of a component capable of forming a crosslinking structure by a radical reaction, a component capable of forming a crosslinking structure by an ionic reaction, and a component capable of forming a crosslinking structure by a pericyclic reaction. The radical reaction, ionic reaction, and pericyclic reaction include reactions that are initiated, reactions that are promoted, and reactions that are both initiated and promoted, by the presence of acids, bases, reaction initiators, and other components in the above composition. The components for initiating and/or promoting such reactions can be contained during preparation of the composition, or can be added prior to use in forming the magnetic layer without being contained during preparation.

The composition can be a single liquid-type composition, or a multi-liquid-type composition of two or more liquids. For example, an embodiment in which the composition (first liquid) containing the crosslinkable polyester and a composition (second liquid) containing a component capable of forming a crosslinking structure by reacting with the polyester are separately prepared and then mixed prior to use in forming a magnetic layer is also included in an aspect of the composition. The contents of the various components given below refer to the contents once all of the component compositions of a multi-liquid-type composition have been combined.

(Combination of the Crosslinkable Components)

The above composition contains a crosslinkable component in the form of the above crosslinkable polyester. In one embodiment, the crosslinking structure is formed between molecules of the crosslinkable polyester. In a second embodiment, the crosslinking structure is formed between the crosslinkable polyester and a crosslinking agent. In a third embodiment, the crosslinking structure is formed between the crosslinkable polyester and a crosslinkable binder. The crosslinkable binder in the third embodiment contains per molecule one or more of the groups capable of undergoing a crosslinking reaction with the reactive group that is present in the crosslinkable polyester. In all of the embodiments, the present inventors presume that the crosslinkable polyester—which has an acidic group that is thought to serve as a moiety that adsorbs to the surface of the particles of ferromagnetic powder and to contribute to forming a crosslinking structure—can participate in increasing the coating strength of the magnetic layer, as set forth above. In a fourth embodiment, the composition contains a crosslinkable component in the form of the above crosslinkable polyester, the above crosslinking agent, and the above crosslinkable binder. The fourth embodiment is an example in which the crosslinkable polyester forms a crosslinking structure with either one, or both, of the crosslinking agent and the crosslinkable binder.

The various above components will be further described below.

<Crosslinkable Polyester>

The composition contains polyester having one or more each of an acidic group and a reactive group selected from the group consisting of a radical reactive group, an ionic reactive group, and a pericyclic reactive group per molecule, with the weight average molecular weight of the polyester falling within a range of 1,000 to 20,000. The composition can contain a single polyester of identical structure, or two or more polyesters of differing structure. When two or more polyesters of differing structure are contained, the content of the crosslinkable polyester that is given further below refers to the combined contents thereof. The same applies to other components that can be incorporated into the magnetic recording medium composition and the magnetic recording medium.

(Weight Average Molecular Weight)

The weight average molecular weight of the crosslinkable polyester falls within a range of 1,000 to 20,000. Keeping the weight average molecular weight of the crosslinkable polyester to within the above range is thought to cause it to play the role of a plasticizer. From this perspective, the weight average molecular weight of the crosslinkable polyester is preferably less than or equal to 12,000, more preferably less than or equal to 10,000. From the above perspective, the weight average molecular weight of the crosslinkable polyester is desirably greater than or equal to 1,500, preferably greater than or equal to 2,000.

The weight average molecular weight referred to in the present invention and present specification is a value that is obtained by taking a measurement by gel permeation chromatography (GPC) with the standard polystyrene conversion. The weight average molecular weights given in Examples further below are values obtained by taking a value measured under the following conditions by GPC with the standard polystyrene conversion.

GPC device: HLC-8220 (made by Tosoh Corp.)
Guard column: TSK guard column Super HZM-H.
Column: TSK gel Super HZ 2000, TSK gel Super HZ 4000, TSK gel Super HZ-M (made by Tosoh Corp, 4.6 mm (inner diameter)×15.0 cm, three columns connected in series)
Eluent: Tetrahydrofuran (THF) containing stabilizer (2,6-di-t-butyl-4-methylphenol)
Eluent flow rate: 0.35 mL/minute
Column temperature: 40° C.
Inlet temperature: 40° C.
Refractive index (RI) measurement temperature: 40° C.
Sample concentration: 0.3 weight %
Quantity of sample injected: 10

(Acidic Group Present in the Polyester)

The crosslinkable polyester contains one or more acidic groups per molecule. The term "acidic group" refers to a group capable of releasing $H^+$ and dissociating into an anion in water or a solution containing water (aqueous solution). As set forth above, the fact that the acidic group can serve as a moiety that adsorbs to the particle surface of the ferromagnetic powder is thought to be why the crosslinkable polyester can enhance dispersion of the ferromagnetic powder. Examples of acidic groups are a carboxyl group, sulfonic acid group, sulfuric acid group, phosphoric acid group, and salts thereof. From the perspective of further enhancing dispersion, a carboxyl group, sulfonic acid group, sulfuric acid group, phosphoric acid group, or salt thereof is desirable; a carboxyl group, sulfonic acid group, or salt thereof is preferred; and a carboxyl group or salt thereof is of greater preference. The term "salt of a carboxyl group (—COOH)" means a carboxy salt where the M in —COOM denotes a cation such as an alkali metal ion. The same applies to the other acidic groups given by way of example above.

It suffices for the crosslinkable polyester to contain one or more acidic groups per molecule, with the presence of two or more being desirable. The number of acidic groups contained per molecule of crosslinkable polyester is, for example, less than or equal to 10, desirably less than or equal to 8. The crosslinkable polyester can contain a single type of acidic group, or can contain two or more different types of acidic groups.

(Reactive Group Present in the Polyester)

The composition contains a crosslinkable component selected from the group consisting of a component capable of forming a crosslinking structure by a radical reaction, a components capable of forming a crosslinking structure by an ionic reaction, and a component capable of forming a crosslinking structure by a pericyclic reaction. The crosslinkable component contains at least the above crosslinkable polyester. The crosslinkable polyester that is the crosslinkable component contains per molecule one or more reactive groups selected from the group consisting of a radical reactive group, ionic reactive group, and pericyclic reactive group. The number of reactive groups contained per molecule of the crosslinkable polyester is desirably 2 or more. The number of reactive groups contained per molecule in the crosslinkable polyester is desirably less than or equal to 8. The reactive groups can be contained at any position in the structure of the crosslinkable polyester, and their incorporation as terminal groups of the crosslinkable polyester is desirable.

The various reactive groups will be described in greater detail below. There are also groups that correspond to two or more among the radical reactive groups, ionic reactive group, and pericyclic reactive group. Such groups can be incorporated into the crosslinkable polyester. As set forth above, the radical reaction, ionic reaction, or pericyclic reaction will sometimes be started in the presence of acids, bases, reaction initiators, and the like. Groups that undergo a radical reaction, ionic reaction, or pericyclic reaction in the presence of such components are included among the reactive groups.

—Radical Reactive Group—

The radical reactive group need only be a group capable of undergoing a radical reaction. Specific desirable examples are a (meth)acrylic group, a (meth)acryloyloxy group, a styryl group, a vinyl group, and an allyl group. In the present invention and present specification, the term "(meth)acrylic group" is used to mean both an acrylic group and a methacrylic group. The term "(meth)acryloyloxy group" is used to mean both acryloyl and methacryloyloxy groups. The radical reactive group selected from the group consisting of a (meth)acrylic group, a (meth)acryloyloxy group, a styryl group, a vinyl group, and an allyl group is capable of undergoing a radical reaction with a radical reactive group selected from the above group to form a crosslinking structure.

—Ionic Reactive Group—

It suffices for the ionic reactive group to be a group capable of undergoing an ionic reaction. Desirable specific examples are a carbamate group, a hydroxyl group, a mercapto group, an aldehyde group, an acetal group, an epoxy group, a (meth)acrylic group, a (meth)acryloyloxy group, a methylol group, a methoxymethyl group, a styryl group, a maleimide group, and an amino group.

The acetal group is a monovalent group of the following structure:

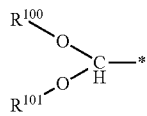

that is the alcohol protected form of an aldehyde group:

The acetal group becomes an aldehyde group when the protection is removed. It is then capable of forming a crosslinking structure by an ionic reaction. In the above, each of $R^{100}$ and $R^{101}$ independently denotes an alkyl group. By way of example, the alkyl groups can be branched or linear alkyl groups with 1 to 6 carbon atoms. The * denotes the position of a bond of the acetal group or aldehyde group with another structure constituting the crosslinkable polyester. The protection can be removed by heating in the presence of an acid. Accordingly, a magnetic recording medium composition containing polyester having an ionic reactive group in the form of an acetal group is either prepared as a composition that contains an acid, or one that is used to form a magnetic layer once an acid has been added. The acid can be an organic or inorganic acid, and is not specifically limited. It suffices to incorporate into the composition a quantity of acid capable of removing the protection from the acetal group to convert it to an aldehyde group, or to add such a quantity of acid to the composition. For example, about 0.1 to 10 weight parts of acid per 100 weight parts of polyester having acetal groups as ionic reactive groups can be incorporated into, or added to, the composition to remove the protection. The protection can usually be properly removed by heating the composition to 60 to 140° C.

Specific examples of groups that are capable of forming a crosslinking structure with a carbamate group by an ionic reaction are an aldehyde group, a methylol group, and a methoxymethyl group. Specific examples of groups that are capable of forming a crosslinking structure with a hydroxyl group by an ionic reaction are an aldehyde group, a methylol group, and a methoxymethyl group. Specific examples of groups that are capable of forming a crosslinking structure with a mercapto group by an ionic reaction are a (meth)acrylic group, a (meth)acryloyloxy group, a styryl group, a maleimide group, a methylol group, and a methoxymethyl group. Specific examples of groups that are capable of forming a crosslinking structure with an aldehyde group by an ionic reaction are a hydroxyl group, a primary amino group, a secondary amino group, and a mercapto group. Specific examples of groups that are capable of forming a crosslinking structure with an epoxy group by an ionic reaction are a mercapto group, a hydroxyl group, a primary amino group, a secondary amino group, and a tertiary amino group. Specific examples of groups that are capable of forming a crosslinking structure with a (meth)acrylic group and a (meth)acryloyloxy group by an ionic reaction are a mercapto group, a primary amino group, and a secondary amino group. Specific examples of groups that are capable of forming a crosslinking structure with a methylol group and a methoxymethyl group by an ionic reaction are a carbamate group, a hydroxyl group, and a mercapto group. Specific examples of groups that are capable of forming a crosslinking structure with a styryl group and a maleimido group by an ionic reaction are a mercapto group. Specific examples of groups that are capable of forming a crosslinking structure with a primary amino group and a secondary amino group by an ionic reaction are an aldehyde group and an epoxy group. Specific examples of groups that are capable of forming a crosslinking structure with a tertiary amino group by an ionic reaction are an epoxy group. Primary amino groups in which branched or linear alkyl groups with 1 to 6 carbon atoms have been substituted for hydrogen atoms are examples of secondary and tertiary amino groups. However, this is not a limitation.

—Pericyclic Reactive Group—

It suffices for the pericyclic reactive group to be a group that is capable of undergoing a pericyclic reaction. Desirable specific examples are a conjugated diene-containing group and a double bond-containing group. The conjugated diene-containing groups can form crosslinking structure with a double bond-containing group by undergoing a pericyclic reaction.

In conjugated diene-containing groups, the conjugated diene structure can be contained in a cyclic structure, or can be contained in a linear structure. At least one, and optionally two or more, conjugated diene structures are contained in the conjugated diene-containing group. The number of such structures is not limited. In double bond-containing groups, the double bond can be contained in a cyclic structure, or can be contained in a linear structure. At least one, and optionally two or more, double bonds are contained in the double bond-containing group. The number of such structures is not limited.

In an embodiment, the conjugated diene-containing group desirably contains a substituent, commonly referred to as an electron-donating group, in the form of a methyl group, alkoxy group, amino group, or the like. Specific examples of conjugated diene-containing groups are a furyl group, a cyclopentadienyl group, an anthranyl group, a piperylene group, and an isoprene group. In an embodiment, the double bond-containing group desirably contains a substituent, commonly referred to as an electron-withdrawing group, such as a carbonyl group, a cyano group, a nitro group, and a sulfonyl group. Specific examples of double bond-containing groups are a maleimido group, an α, β-unsaturated carbonyl group, and a methylene malonic acid ester group.

The crosslinkable polyester that is contained in the above composition is not specifically limited beyond being polymer that contains polyester chain(s), that has a weight average molecular weight falling within the range set forth above, and that contains one or more each of an acidic group and the above reactive group per molecule. The term "polyester chain" refers to a molecular chain containing two or more ester bonds. It can be an aliphatic polyester chain in which the ester bonds are connected by alkylene groups, or an aromatic polyester chain having aromatic rings between the ester groups. From the perspective of further enhancing dispersion of the ferromagnetic powder, the polyester chain is desirably an aliphatic polyester chain.

From the perspective of further enhancing dispersion of the ferromagnetic powder, the above crosslinkable polyester desirably has a structure that contains at least two acidic groups, and the number of acidic group bonded to each of two adjacent carbon atoms is respectively one. Examples of the acidic groups that are contained in such a structure are the acidic groups denoted by $A^3$ and $A^4$ in the partial structure given below.

In one embodiment, the crosslinkable polyester has the following partial structure:

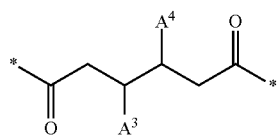

In the above partial structure, each of $A^3$ and $A^4$ independently denotes an acidic group. * denotes the position of a bond with another structure constituting the crosslinkable polyester. In the above partial structure, * preferably denotes the position of a bond with the polyester chain that is contained in the above crosslinkable polyester.

Specific embodiments of the crosslinkable polyester will be described below. However, the present invention is not limited by the following specific embodiments.

(Specific Embodiments of the Polyester)

Examples of specific embodiments of the crosslinkable polyester are the polyesters denoted by general formulas 1 and 2 below. These polyesters will be described below.

—Polyester Denoted by Formula 1—

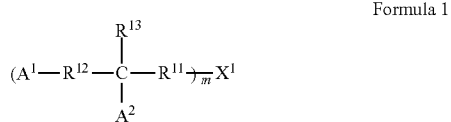

Formula 1

(In formula 1, $A^1$ denotes a monovalent group containing the above reactive group and polyester chain. Each of $R^{11}$ and $R^{12}$ independently denotes a single bond or a divalent connecting group. $R^{13}$ denotes a hydrogen atom or a monovalent group, and m denotes an integer of greater than or equal to 2. The multiple instances of $A^1$, $R^{11}$, $R^{12}$, and $R^{13}$, respectively, can be identical or different. $A^2$ denotes a hydroxyl group or a monovalent group denoted by —O—$R^{14}$—$Z^1$, where $R^{14}$ denotes a single bond or a divalent connecting group and $Z^1$ denotes an acidic group, at least one instance of the multiple instances of $A^2$ that are present denotes a monovalent group denoted by —O—$R^{14}$—$Z^1$. $X^1$ denotes a connecting group of valence m.)

In formula 1, $A^1$ denotes a monovalent group containing the above reactive group and polyester chain. In formula 1, since m denotes an integer of greater than or equal to 2, the polyester denoted by formula 1 contains at least two instances of $A^1$. These two or more instances of $A^1$ can be identical or different.

Details regarding the above reactive group are as set forth above.

The monovalent group contained in $A^1$ in formula 1 can be obtained by introducing the above reactive group by a known reaction into a residue of polyester containing linear hydrocarbon groups in structural units having ester bonds that is obtained by a ring-opening polymerization of a lactone compound, or into a structure in which terminal groups such as hydrogen atoms have been removed from polyesters containing aromatic hydrocarbon groups in structural units having ester bonds, such as polyethylene terephthalate and polyethylene naphthalate.

Examples of the above lactone compound are: ε-caprolactone, δ-caprolactone, β-propiolactone, γ-butyrolactone, δ-valerolactone, γ-valerolactone, enanthralactone, β-butyrolactone, γ-hexanolactone, γ-octanolactone, δ-hexalanolactone, δ-octanolactone, δ-dodecanolactone, α-methyl-γ-butyrolactone, and lactides. From the perspectives of reactivity and availability, ε-caprolactone, lactides, and δ-valerolactone are desirable. However, this is not a limitation. Any lactone compound that will yield polyester by ring-opening polymerization will suffice.

In formula 1, each of $R^{11}$ and $R^{12}$ independently denotes a single bond or a divalent connecting group. In formula 1, since m denotes an integer that is greater than or equal to 2, two or more instances of each of $R^{11}$ and $R^{12}$ are contained in the compound denoted by formula 1. The two or more instances of $R^{11}$ and $R^{12}$ can be identical or different. Examples of divalent connecting groups are divalent connecting groups comprised of 1, or a combination of two or more, selected from the group consisting of linear, branched, or cyclic-structured alkylene groups, linear, branched, or cyclic-structured alkenylene groups, —C(=O)—, —O—, and arylene groups, in the form of the above divalent connecting group optionally substituted with, or containing, anions in the form of halogen atoms. More specific examples are divalent connecting groups comprised of 1, or a combination of two or more, selected from the group consisting of linear, branched, or cyclic-structured alkylene groups having 1 to 12 carbon atoms, linear, branched, or cyclic-structured alkenylene groups having 1 to 6 carbon atoms, —C(=O)—, —O—, and phenylene groups, in the form of the above divalent connection group optionally substituted with, or containing, anions in the form of halogen atoms. The divalent connecting groups are desirably divalent connecting groups comprised of 1 to 10 carbon atoms, 0 to 10 oxygen atoms, 0 to 10 halogen atoms, and 1 to 30 hydrogen atoms. A specific example is the following structure. In the structure below, * denotes the position of a bond with another structure in formula 1. However, the present invention is not limited to these specific examples.

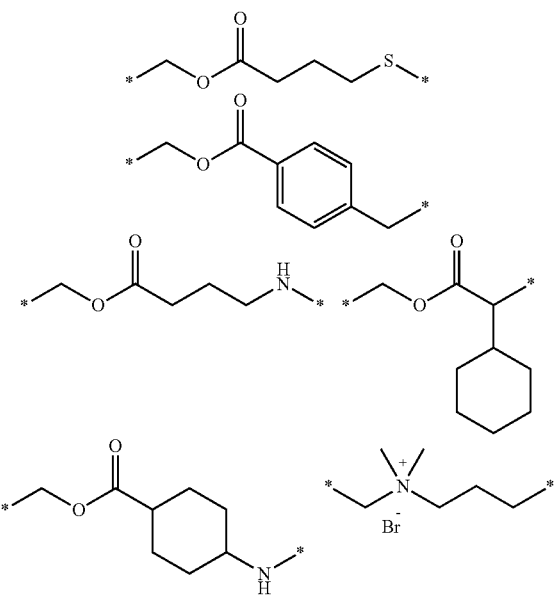

-continued

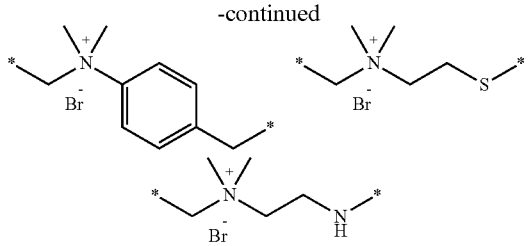

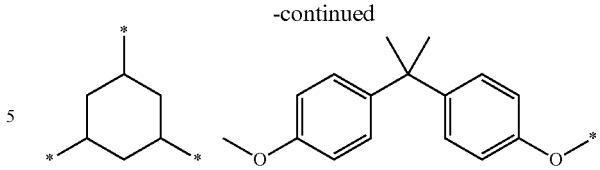

Each of $R^{11}$ and $R^{12}$ desirably independently denotes an alkylene group, preferably an alkylene group with 1 to 12 carbon atoms, more preferably an alkylene group with 1 to 5 carbon atoms, and still more preferably, an unsubstituted alkylene group with 1 to 5 carbon atoms.

In formula 1, $R^{13}$ denotes a hydrogen atom or a monovalent group. The monovalent groups described above as substituents are examples of the monovalent group. Alkyl groups are desirable, alkyl groups having 1 to 6 carbon atoms are preferred, and a methyl group or an ethyl group is of greater preference. Still more preferably, $R^{13}$ is a hydrogen atom.

In formula 1, m denotes an integer greater than or equal to 2, desirably an integer falling within a range of 2 to 10, preferably an integer falling within a range of 2 to 8, more preferably an integer falling within a range of 2 to 5, and still more preferably, the integer 3 or 4.

In formula 1, $X^1$ denotes a connecting group of valence m, where m is as described above.

Examples of the connecting group of valence m denoted by $X^1$ are connecting groups comprised of one, or a combination of two or more, selected from the group consisting of —C(=O)—O—, —O—, —C(=O)—NR— (where R denotes a hydrogen atom or an alkyl groups with 1 to 4 carbon atoms), —O—C(=O)—NH—, phenylene groups, and alkylene groups with 1 to 30 carbon atoms. $X^1$ can contain a cyclic structure in a structure comprised of a combination of two or more selected from the above group. The connecting group of valence m denoted by $X^1$ desirably contains one or more structures selected from the group consisting of cyclic structures and branched structures. The present inventors presume that the presence of such a structure can contribute to enhancing dispersion of the ferromagnetic powder.

Specific examples of the connecting group denoted by $X^1$ are the structures given below. In these structures, * denotes the position of a bond with another structure in formula 1. However, the present invention is not limited to the specific examples given below.

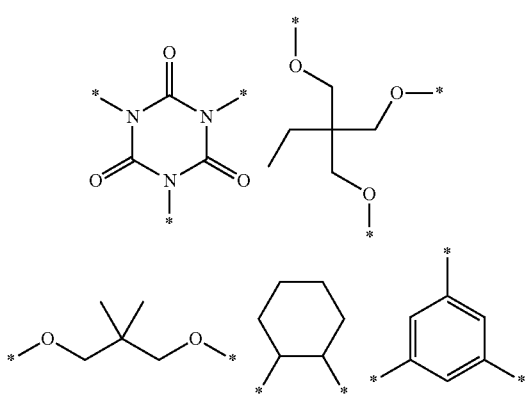

In formula 1, $A^2$ denotes a hydroxyl group or a monovalent group denoted by —O—$R^{14}$—$Z^1$. Here, $R^{14}$ denotes a divalent connecting group and $Z^1$ denotes an acidic group. Since m denotes an integer of greater than or equal to 2 in formula 1, multiple (two or more) instances of $A^2$ are contained in formula 1. At least one of the multiple instances of $A^2$ denotes the monovalent group denoted by —O—$R^{14}$—$Z^1$. In the polyester denoted by formula 1, the present inventors assume that incorporating at least one acidic group as one of the multiple instances of $A^2$ can contribute to enhancing the dispersion of the ferromagnetic powder. The acidic group is as described above.

At least one, and desirably two or more, of the multiple instances of $A^2$ that are present in formula 1 are the above monovalent groups. It is desirable for all of the multiple instances of $A^2$ that are present to be the above monovalent groups.

$R^{14}$ denotes a single bond or a divalent connecting group. The description of the divalent connecting group is as set forth above for the divalent connecting groups denoted by $R^{11}$ and $R^{12}$.

Synthesis Method

The above-described polyester denoted by formula 1 can be synthesized by known methods. An example of a synthesis method contains the steps of:

obtaining a ring-opened adduct containing $A^1$ set forth above and hydroxyl groups by conducting a ring-opening addition reaction with a polyfunctional epoxy compound with two or more epoxy groups substituted onto a base nucleus structure and a polyester imparting $A^1$; and obtaining an acid anhydride-modified product by modifying the ring-opened adduct with an acid anhydride to convert at least one of the hydroxyl groups of the ring-opened adduct into a monovalent group denoted by —O—$R^{14}$—$Z^1$.

In one embodiment, the above reactive group contained in $A^1$ can be introduced by employing a starting material containing the above reactive group during polyester polymerization. In another embodiment, the reactive group contained in $A^1$ can be introduced following polyester polymerization.

Various compounds containing the above-described structure denoted by $X^1$ as a partial structure in addition to two or more epoxy groups are examples of the above polyfunctional epoxy compound.

The ring-opening addition reaction of the polyfunctional epoxy compound and the polyester imparting $A^1$ can be implemented—for example, in the case of polyester with terminal functional groups in the form of carboxyl groups—by mixing the polyester in a ratio of 0.9 to 1.2 mols of carboxylic acid per equivalent of epoxy groups with a resin having two or more epoxy groups per molecule, and heating and stirring the mixture for about 3 to 12 hours without solvent, or as needed, in an organic solvent with a relatively high boiling point of greater than or equal to 80° C., in the presence of a reaction catalyst such as a tertiary amine or quaternary ammonium salt.

Any of the above acid anhydrides that impart acidic groups set forth above can be employed without limitation as the acid anhydride that is reacted with the ring-opened adduct obtained. Examples are carboxylic anhydride and sulfonic acid anhydride. Specific examples are succinic anhydride, phthalic anhydride, 2,3-naphthalene dicarboxylic anhydride, and other carboxylic anhydrides; and 2-sulfobenzoic anhydride, tetrabromo-o-sulfobenzoic anhydride, and other sulfonic anhydrides.

The reaction that modifies the ring-opened adduct with the acid anhydride can be implemented—for example, when using phthalic anhydride—by mixing phthalic anhydride in a ratio of 0.9 to 1.2 mols of phthalic anhydride per equivalent of hydroxyl groups and heating and stirring the mixture for about 3 to 12 hours without solvent, or as needed, in an organic solvent with a boiling point of greater than or equal to 50° C., in the presence of a reaction catalyst such as a tertiary amine or an inorganic base.

Following the above reactions, subsequent processing such as purification can be conducted as needed.

The above synthesis method is an example and is not intended to limit the present invention in any way.

—Polyester Denoted By Formula 2—

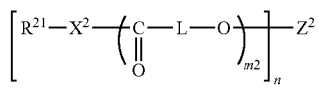

Formula 2

(In formula 2, $R^{21}$ denotes the above reactive group. $X^2$ denotes —O—, —S—, or —$NR^{22}$—. $R^{22}$ denotes a hydrogen atom or a monovalent group. L denotes a divalent connecting group. $Z^2$ denotes a partial structure of valence n containing one or more acidic groups; m2 denotes an integer of greater than or equal to 2; and n denotes an integer of greater than or equal to 1.)

In formula 2, m2×n instances of L are present and n instances each of $R^{21}$ and $X^2$ are present. When multiple instances of L are present in formula 2, the multiple instances of L can be identical or different. The same applies to $R^{21}$ and $X^2$.

In formula 2, $X^2$ denotes —O—, —S—, or —$NR^{22}$—. $R^{22}$ denotes a hydrogen atom or a monovalent group. Examples of monovalent groups are those described above as substituents. Alkyl groups are desirable, alkyl groups having 1 to 6 carbon atoms are preferred, and a methyl group or an ethyl group is of greater preference. Still more preferably, $R^{22}$ denotes a hydrogen atom. $X^2$ desirably denotes —O—.

$R^{21}$ denotes the above reactive group. The details are as set forth above.

In formula 2, L denotes a divalent connecting group. The description of the divalent connecting group is as set forth above for the divalent connecting groups denoted by $R^{11}$ and $R^{12}$ in formula 1.

L is desirably an alkylene group, preferably an alkylene group having 1 to 12 carbon atoms, more preferably an alkylene group having 1 to 5 carbon atoms, and still more preferably, an unsubstituted alkylene group having 1 to 5 carbon atoms.

$Z^2$ denotes a partial structure of valence n containing one or more acidic groups. In each instance of $Z^2$, at least one acidic group is contained, two or more acidic groups are desirably contained, and 2 to 4 are preferably contained.

$Z^2$ can contain one or more from among a linear structure, branched structure, and cyclic structure. From the perspective of facilitating synthesis, $Z^2$ is desirably the reaction residue of a carboxylic anhydride. The structures given below are specific examples. In these structures, * denotes the position of a bond with another structure in formula 2. However, there is no intent to limit the present invention to these specific examples.

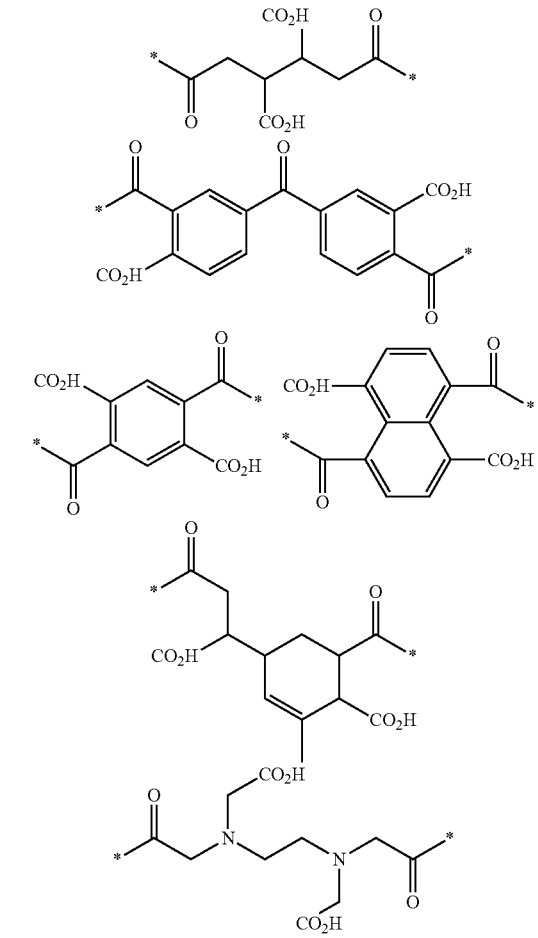

The polyester denoted by formula 2 containing the above monovalent reaction residue can be obtained by employing a carboxylic anhydride having one partial structure in the form of the —(C=O)—O—(C=O)— set forth above to synthesize the polyester denoted by formula 2. The use of a carboxylic anhydride having two such structures makes it possible to obtain the polyester denoted by formula 2 containing reaction residues that are divalent. The same applies to polyesters denoted by formula 2 containing reaction residues that are trivalent or higher. As set forth above, n is an integer of greater than or equal to 1. It is, for example, an integer falling within a range of 1 to 4, desirably an integer falling within a range of 2 to 4.

Employing a carboxylic anhydride in the form of, for example, a tetracarboxylic anhydride, makes it possible to obtain the polyester denoted by formula 2 in which n=2. The term "tetracarboxylic anhydride" refers to a carboxylic anhydride containing two of the above partial structures per molecule due to the dehydration condensation of the two pairs of carboxyl groups in a compound having four carboxyl groups per molecule. From the perspective of further increasing the durability of the magnetic layer and the dispersion of ferromagnetic powder, the polyester in which $Z^2$ in formula 2 denotes a monovalent group in which the above reactive group has been introduced into the reactive residue of a tetracarboxylic anhydride is desirable. Examples of tetracarboxylic anhydrides are various types of tetracarboxylic anhydrides such as aliphatic tetracarboxylic acid anhydrides, aromatic tetracarboxylic anhydrides, and polycyclic tetracarboxylic anhydrides.

Examples of aliphatic tetracarboxylic anhydrides are: meso-butane-1,2,3,4-tetracarboxylic dianhydride, 1,2,3,4-cyclobutanetetracarboxylic dianhydride, 1,3-dimethyl-1,2,3,4-cyclobutanetetracarboxylic dianhydride, 1,2,3,4-cyclopentanetetracarboxylic dianhydride, 2,3,5-tricarboxycyclopentylacetic dianhydride, 2,3,5,6-tetracarboxycyclohexane dianhydride, 2,3,5,6-tetracarboxynorbornane dianhydride, 3,5,6-tricarboxynorbornane-2-acetic dianhydride, 2,3,4,5-tetrahydrofurantetracarboxylic dianhydride, 5-(2,5-dioxotetrahydrofuryl)-3-methyl-3-cyclohexene-1,2-dicarboxylic dianhydride, bicyclo[2.2.2]-oct-7-ene-2,3,5,6-tetracarboxylic anhydride, and ethylene diamine tetraacetic anhydride.

Examples of aromatic tetracarboxylic anhydrides are: pyromellitic dianhydride, ethylene glycol trimellitic acid ester dianhydride, propylene glycol trimellitic acid ester dianhydride, butylene glycol trimellitic acid ester dianhydride, 3,3',4,4'-benzophenonetetracarboxylic acid dianhydride, 2,2',3,3'-benzophenonetetracarboxylic acid dianhydride, 3,3',4,4'-biphenylsulfonetetracarboxylic acid dianhydride, 2,2',3,3'-biphenylsulfonetetracarboxylic acid dianhydride, 1,4,5,8-naphthalenetetracarboxylic acid dianhydride, 2,3,6,7-naphthalenetetracarboxylic acid dianhydride, 3,3',4,4'-biphenylethertetracarboxylic acid dianhydride, 3,3',4,4'-dimethyldiphenylsilanetetracarboxylic acid dianhydride, 3,3',4,4'-tetraphenylsilanetetracarboxylic acid dianhydride, 1,2,3,4-furanetetracarboxylic acid dianhydride, 4,4'-bis(3,4-dicarboxyphenoxy)diphenylsulfide dianhydride, 4,4'-bis(3,4-dicarboxyphenoxy)diphenylsulfone dianhydride, 4,4'-bis(3,4-dicarboxyphenoxy)diphenylpropane dianhydride, 3,3',4,4'-perfluoroisopropylidene diphthalic dianhydride, 3,3',4,4'-biphenyltetracarboxylic dianhydride, bis(phthalic acid)phenylphosphineoxide dianhydride, p-phenylene-bis(triphenylphthalic acid) dianhydride, M-phenylene-bis(triphenylphthalic acid) dianhydride, bis(triphenylphthalic acid)-4,4'-diphenyl ether dianhydride, bis(triphenylphthalic acid)-4,4'-diphenylmethane dianhydride, 9,9-bis(3,4-dicarboxyphenyl)fluorene dianhydride, and 9,9-bis[4-(3,4-dicarboxyphenoxy)phenyl]fluorene dianhydride.

Examples of polycyclic tetracarboxylic anhydrides are 3,4-dicarboxy-1,2,3,4-tetrahydro-1-naphthalenesuccinic dianhydride and 3,4-dicarboxy-1,2,3,4-tetrahydro-6-methyl-1-naphthalene succinic dianhydride.

In formula 2, m2 denotes an integer of greater than or equal to 2. In the polyester denoted by formula 2, the structure (polyester chain) denoted by —((C=O)—L-O)m2 is thought to contribute to enhancing dispersion of the ferromagnetic powder and improving the durability of the magnetic layer. From these perspectives, m2 is desirably an integer falling within a range of 5 to 200, preferably an integer falling within a range of 5 to 100, and more preferably, an integer falling within a range of 5 to 60.

Specific examples of the polyester denoted by formula 2 are the various polyesters described in Examples further below.

Synthesis Method

The polyester denoted by formula 2 set forth above can be synthesized by known methods. One example of the synthesis method is the method of subjecting a carboxylic anhydride and the compound denoted by formula 3 below to a reaction such as a ring-opening addition reaction. In formula 3, each of $R^{21}$, $X^2$, L, and m2 are defined as in formula 2. A denotes a hydrogen atom, alkali metal atom, or quaternary ammonium salt group, and desirably denotes a hydrogen atom. In one embodiment, the reactive group denoted by $R^{21}$ can be introduced by employing a starting material containing the reactive group during polyester polymerization. In another embodiment, the reactive group denoted by $R^{21}$ can be introduced after polyester polymerization.

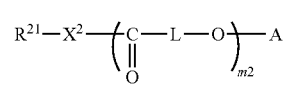

Formula 3

The reaction of carboxylic anhydride and the compound denoted by formula 3 can be implemented—for example, when using butanetetracarboxylic anhydride—by mixing butanetetracarboxylic anhydride in a ratio of 0.4 to 0.5 mol per equivalent of hydroxyl groups, and heating and stirring the mixture without solvent, or in an organic solvent with a boiling point greater than or equal to 50° C. as needed, in the presence of a reaction catalyst such as a tertiary amine or inorganic base, for about 3 to 12 hours. Even when employing some other carboxylic anhydride, the reaction of the carboxylic anhydride and the compound denoted by formula 3 can be implemented according to the above reaction conditions or known reaction conditions.

Following the above reaction, subsequent processing such as purification can be conducted as needed.

The compound denoted by formula 3 can be employed in the form of a commercial product or in a form obtained by a known polyester synthesis method. The ring-opening polymerization of a lactone is an example of the polyester synthesis method. Examples of lactones are: ε-caprolactone, δ-caprolactone, β-propiolactone, γ-butyrolactone, δ-valerolactone, γ-valerolactone, enanthralactone, β-butyrolactone, γ-hexanolactone, γ-octanolactone, δ-hexanolactone, δ-octanolactone, δ-dodecanolactone, α-methyl-γ-butyrolactone, and lactides. The lactides can be L-form or D-form. In polyester synthesis, a single type of lactone can be employed, or two or more different structures can be employed. Lactones in the form of ε-caprolactone, lactides, or δ-valerolactone are desirable from the perspectives of reactivity and availability. However, there is no limitation to these compounds; any lactone can be employed so long as it permits the obtaining of polyester by ring-opening polymerization.

A nucleophilic reagent in the form of an alcohol, thiol, amine, or the like can be employed for lactone ring-opening polymerization. A single nucleophilic reagent, or a mixture of two or more, can be employed.

For example, when employing an alcohol denoted by $R^2OH$, the $R^2O$—portion can be present as the $R^{21}X^2$—portion in the structure denoted by formula 2. $X^2$ denotes —O—.

For example, when employing a thiol denoted by $R^2SH$, the $R^2S$—portion can be present as the $R^{21}X^2$—portion in the structure denoted by formula 2. $X^2$ denotes —S—.

When employing an amine denoted by $R^{21}R^{22}NH$, the $R^{21}R^{22}N$—portion can be present as the $R^{21}X^2$—portion in the structure denoted by formula 2. $X^2$ denotes —$NR^{22}$—. Each of $R^{21}$ and $R^{22}$ is as defined in formula 2.

However, the compound denoted by formula 3 is not limited to structures derived from polyester obtained by the ring-opening polymerization of a lactone. It can be a structure derived from polyester obtained by a known polyester synthesis method, such as the polycondensation of a polyvalent carboxylic acid and a polyhydric alcohol or the polycondensation of hydroxycarboxylic acid.

The synthesis methods set forth above are examples and are not intended to limit the present invention in any way. Any known synthesis method can be employed without limitation so long as it permits the synthesis of the polyester denoted by formula 2.

(Polyester Content)

The content of the crosslinkable polyester described above in the composition is desirably greater than or equal to 0.5 weight part, preferably greater than or equal to 1.0 weight part, per 100.0 weight parts of ferromagnetic powder from the perspectives of enhancing dispersion of the ferromagnetic powder and increasing the durability of the magnetic layer. To further increase the recording density, it is desirable to increase the fill rate of the ferromagnetic powder in the magnetic layer. From this perspective, it is desirable to reduce the relative content of components other than ferromagnetic powder. From these perspectives, the content of the crosslinkable polyester is desirably less than or equal to 50.0 weight parts, preferably less than or equal to 40.0 weight parts, and more preferably, less than or equal to 30.0 weight parts per 100.0 weight parts of ferromagnetic powder.

<Crosslinking Agents>

In one embodiment, the composition can contain a crosslinkable component in the form of a compound (crosslinking agent) containing per molecule two or more groups capable of undergoing a crosslinking reaction with the reactive group present in the crosslinkable polyester. The fact that the reaction between this crosslinking agent and the crosslinkable polyester forms a crosslinking structure is presumed by the present inventors to contribute to increasing the coating strength of the magnetic layer.

The groups that are capable of undergoing a crosslinking reaction that are present in the crosslinking agent are not specifically limited so long as they are capable of forming a crosslinking structure by the above-described reaction with the reactive group present in the crosslinkable polyester. Specific examples of such groups have been described above. The crosslinking agent contains 2 or more, desirably 3 or more, groups capable of undergoing a crosslinking reaction per molecule. From the perspective of better promoting the crosslinking reaction, the number of groups capable of undergoing a crosslinking reaction that are present per molecule of crosslinking agent is desirably less than or equal to 10, preferably less than or equal to 6. Structures other than groups capable of undergoing a crosslinking reaction in the crosslinking agent are not specifically limited and can be selected as desired from the perspective of compatibility with the binder and/or the crosslinkable polyester that are contained in the composition.

From the perspective of promoting the crosslinking reaction, the molecular weight of the crosslinking agent is desirably greater than or equal to 100, preferably greater than or equal to 300. From the perspective of increasing the crosslinking density (and thus further enhancing the coating strength of the magnetic layer) and compatibility with the binder, the molecular weight of the crosslinking agent is desirably less than or equal to 5,000, preferably less than or equal to 3,000, and still more preferably, less than or equal to 1,000.

When the composition contains a crosslinking agent, the content of the crosslinking agent in the composition can fall, for example, within a range of 5.0 to 30.0 weight parts, and desirably falls within a range of 5.0 to 20.0 weight parts, per 100.0 weight parts of ferromagnetic powder.

<Binder>

Various resins that are commonly employed as binders in particulate magnetic recording media can be employed without limitation as the binder contained in the composition. The binder employed can be in the form of polyurethane resin, polyester resin, polyamide resin, vinyl chloride resin, copolymerized acrylic resins of styrene, acrylonitrile, methyl methacrylate and the like; nitrocellulose and other cellulose resins; epoxy resin; phenoxy resin; polyvinyl acetal, polyvinyl butyral, and other polyvinyl alkyrals; these resins can be employed singly or two or more resins can be mixed for use. Of these, polyurethane resins, acrylic resins, cellulose resins, and vinyl chloride resins are desirable, and polyurethane resins and vinyl chloride resins are preferable. These resins can also be employed as binders in the non-magnetic layer, described further below.

Reference can be made to Japanese Unexamined Patent Publication (KOKAI) No. 2010-24113, which is expressly incorporated herein by reference in its entirety, paragraphs 0028 to 0031, with regard to the binders.

As stated above, the weight average molecular weight of the crosslinkable polyester falls within a range of 1,000 to 20,000. From the perspective of properly utilizing the plasticizing effect of the polyester on the binder, the weight average molecular weight of the binder desirably exceeds 20,000, and is preferably greater than or equal to 30,000. The weight average molecular weight of the binder is, for example, less than or equal to 120,000, desirably less than or equal to 100,000, and more preferably, less than or equal to 60,000.

The binder content, for example, falls within a range of 5.0 to 50.0 weight parts, desirably falls within a range of 10.0 to 30.0 weight parts, per 100.0 weight parts of ferromagnetic powder.

In one embodiment, the composition can contain a crosslinkable component in the form of binder. The crosslinkable component in the form of binder (crosslinkable binder) contains per molecule one or more groups capable of undergoing a crosslinking reaction with the reactive groups present in the crosslinkable polyester. The content of the groups within the crosslinkable binder that are capable of undergoing a crosslinking reaction falls, for example, within a range of 5 to 50 mol %, desirably within a range of 10 to 40 mol %.

The content of the crosslinkable binder within the composition falls, for example, within a range of 5.0 to 50.0 weight parts, desirably within a range of 10.0 to 30.0 weight parts, per 100.0 weight parts of ferromagnetic powder.

<Ferromagnetic Powder>

The composition contains ferromagnetic powder in addition to various components set forth above. The average particle size of the ferromagnetic powder is desirably less than or equal to 50 nm. Ferromagnetic powder with an average particle size of less than or equal to 50 nm is able to achieve the high-density recording that has been demanded in recent years. However, it is not easy to achieve a high degree of dispersion. By contrast, use of the above polyester can make it possible to enhance the dispersion of ferromagnetic powder having an average particle size of less than or equal to 50 nm. From the perspective of the stability of magnetization, the average particle size is desirably greater than or equal to 10 nm, preferably greater than or equal to 20 nm.

Hexagonal ferrite powder is a specific example of desirable ferromagnetic powder. From the perspectives of achieving higher density recording and magnetization stability, the average particle size (average plate diameter) of hexagonal ferrite powder desirably ranges from 10 nm to 50 nm, preferably 20 nm to 50 nm. Reference can be made to Japanese Unexamined Patent Publication (KOKAI) No. 2011-216149, paragraphs 0134 to 0136, for details on hexagonal ferrite powder. The content of the above publication is expressly incorporated herein by reference in its entirety.

Ferromagnetic metal powder is also a specific example of desirable ferromagnetic powder. From the perspectives of achieving higher density recording and magnetization stability, the average particle size (average major axis length) of ferromagnetic metal powder desirably ranges from 10 nm to 50 nm, preferably 20 nm to 50 nm. Reference can be made to Japanese Unexamined Patent Publication (KOKAI) No. 2011-216149, paragraphs 0137 to 0141, for details on ferromagnetic metal powder.

The content (fill rate) of the ferromagnetic powder in the magnetic layer desirably falls within a range of 50 to 90 weight %, preferably within a range of 60 to 90 weight %. It is desirable for the fill rate to be high from the perspective of increased recording density.

<Solvent>

The composition normally contains the various components set forth above in solvent. Examples of the solvent are the organic solvents commonly employed to manufacture particulate magnetic recording media. Specific examples are: acetone, methyl ethyl ketone, methyl isobutyl ketone, diisobutyl ketone, cyclohexanone, isophorone, tetrahydrofuran, and other ketones; methanol, ethanol, propanol, butanol, isobutyl alcohol, isopropyl alcohol, methylcyclohexanol, and other alcohols; methyl acetate, butyl acetate, isobutyl acetate, isopropyl acetate, ethyl lactate, glycol acetate, and other esters; glycol dimethyl ether, glycol monoethyl ether, dioxane, and other glycol ethers; benzene, toluene, xylene, cresol, clorobenzene, and other aromatic hydrocarbons; methylene chloride, ethylene chloride, carbon tetrachloride, chloroform, ethylene chlorohydrin, dichlorobenzene, and other chlorinated hydrocarbons; N,N-dimethylformamide; and hexane. They can be employed in any ratio. Of these, the use of organic solvents containing ketone (ketone organic solvents) is desirable from the perspectives of the solubility of the binders that are commonly employed in magnetic recording media and adsorption of the binder to the surface of the particles of ferromagnetic powder.

The above organic solvent does not have to be 100 percent pure, and may contain impurities, such as foreign matter, unreacted material, byproducts, decomposition products, oxides, and moisture, in addition to the primary component. These impurities desirably constitute equal to or less than 30 weight %, preferably equal to or less than 10 weight %. Somewhat strong polarity is desirable for enhancing dispersion; it is desirable for the solvent composition to comprise equal to or greater than 50 weight % of a solvent with a dielectric constant of equal to or greater than 15. A dissolution parameter of 8 to 11 is desirable. The quantity of solvent in the composition is not specifically limited, and can be set to the range as in a common composition for forming a magnetic layer in a particulate magnetic recording medium.

<Other Components>

In addition to the various components set forth above, additives can be added as needed to the composition. Examples of additives are the various additives commonly employed to form particulate magnetic recording media, such as abrasives, lubricants, dispersing agents, dispersing adjuvants, antifungal agents, antistatic agents, oxidation inhibitors, and carbon black. The additives can be suitably selected for use from among commercial products based on desired properties. The crosslinkable polyester can function as a dispersing agent in the composition.

As set forth above, the composition can contain components that initiate the reaction, promote the reaction, or both initiate and promote the reaction. Such components can be suitably selected for use from among known reaction initiators such as acids, bases, and radical initiators. It suffices to set the content of the component in the composition to a quantity that suitably contributes to initiating and/or promoting the reaction.

<Method of Preparing the Composition>

The composition can be prepared by sequentially admixing, either simultaneously or in any order, the various components that have been set forth above. The method of preparing the composition is not specifically limited. Known techniques relating to the preparation of magnetic layer-forming compositions for particulate magnetic recording media can be applied without limitation.

[Magnetic Recording Medium and Method of Manufacturing the Same]

The processing to crosslink the crosslinkable components contained in the composition can be conducted by a heat treatment, light irradiation, or the like, which can be conducted in the process of manufacturing a magnetic recording medium. Conducting the above processing in the form of heating is desirable because it permits the formation of a crosslinking structure without requiring light-irradiating equipment. The process of manufacturing a magnetic recording medium normally includes a heat treatment to dry the magnetic layer-forming composition. In one embodiment, the crosslinkable components can be crosslinked in such heat treatment.

That is, an aspect of the present invention relates to a method of manufacturing a magnetic recording medium having a magnetic layer on a nonmagnetic support, in which the magnetic layer is formed by a step of heating the above composition.

A further aspect of the present invention relates to a magnetic recording medium that is manufactured by the above manufacturing method.

<Structure and Method of Manufacturing the Magnetic Recording Medium>

The structure and method of manufacturing the above magnetic recording medium will be described in greater detail below.

(Magnetic Layer)

The magnetic layer can be formed by directly coating and drying the composition on the surface of a nonmagnetic support, or coating it on the surface of another layer, such as a nonmagnetic layer provided on the nonmagnetic support. Normally, processing such as heating is conducted. The various components contained in the magnetic layer and the composition that can be used to form the magnetic layer are as set forth above.

(Nonmagnetic Layer)

Details of the nonmagnetic layer will be described next. In the above magnetic recording medium, a nonmagnetic layer containing nonmagnetic powder and binder can be present between the nonmagnetic support and the magnetic layer. Either inorganic substances or organic substances can be employed as the nonmagnetic powder in the nonmagnetic layer. Carbon black can also be employed. Examples of inorganic substances are metals, metal oxides, metal carbonates, metal sulfates, metal nitrides, metal carbides, and metal sulfides. These nonmagnetic powders are available as commercial products and can be manufactured by known methods. Reference can be made to Japanese Unexamined Patent Publication (KOKAI) No. 2011-216149, paragraphs 0146 to 0150, for details in this regard.

The binders, lubricants, dispersing agents, other additives, solvents, dispersion methods, and the like of the magnetic layer can be applied to the nonmagnetic layer. In particular, techniques that are known with regard to the magnetic layer can be applied to the quantity and type of binder and the quantities and types of additives and dispersing agents that are added. It is also possible to add carbon black and organic powders to the nonmagnetic layer. In that regard, reference can be made to Japanese Unexamined Patent Publication (KOKAI) No. 2010-24113, paragraphs 0040 to 0042, for example. The composition for forming the nonmagnetic layer can contain a suitable quantity of a curing agent (such as polyisocyanate) that is normally used to manufacture magnetic recording media. This also applies to the back coat layer, described further below. It is possible for the magnetic layer to contain, or not contain, such a curing agent.

(Nonmagnetic Support)

Details of the nonmagnetic support will be described next. Examples of nonmagnetic supports are known supports such as biaxially stretched polyethylene terephthalate, polyethylene naphthalate, polyamide, polyamide-imide, and aromatic polyamide. Of these, polyethylene terephthalate, polyethylene naphthalate, and polyamide are desirable.

These supports can be subjected to corona discharge, plasma treatment, adhesion-enhancing treatment, and heat treatment in advance.

(Layer Structure)

With regard to the thickness of the nonmagnetic support and each layer in the magnetic recording medium, the thickness of the nonmagnetic support desirably ranges from 3.0 μm to 80.0 μm. The thickness of the magnetic layer can be optimized for the magnetization saturation and head gap length of the magnetic head employed, the bandwidth of the recording signal, and the like, and is generally 10 nm to 150 nm, desirably 20 nm to 120 nm, preferably 30 nm to 100 nm. It suffices for the magnetic layer to be comprised of at least one layer, and it can be separated into two or more layers of differing magnetic characteristics. A structure relating to a known multilayer magnetic layer can be applied.

The thickness of the nonmagnetic layer is, for example, 0.1 μm to 3.0 μm, desirably 0.1 μm to 2.0 μm, and preferably 0.1 μm to 1.5 μm. The nonmagnetic layer in the present invention includes an essentially nonmagnetic layer containing trace quantities of ferromagnetic powder, for example, either as impurities or intentionally, in addition to the nonmagnetic powder. The essentially nonmagnetic layer means a layer exhibiting a residual magnetic flux density of equal to or less than 10 mT, a coercive force of equal to or less than 7.96 kA/m (100 Oe), or a residual magnetic flux density of equal to or less than 10 mT and a coercive force of equal to or less than 7.96 kA/m (100 Oe). The nonmagnetic layer desirably has no residual magnetic flux density or coercive force.

(Backcoat Layer)

In the magnetic recording medium, a backcoat layer can be provided on the opposite surface of the nonmagnetic support from the surface on which the magnetic layer is present. The backcoat layer desirably contains carbon black and inorganic powder. The formula of the magnetic layer or nonmagnetic layer can be applied to the binder and various additives for forming the backcoat layer. The backcoat layer is desirably equal to or less than 0.9 μm, preferably 0.1 to 0.7 μm in thickness.

(Manufacturing Steps)

The above magnetic recording medium composition is employed as a composition for forming a magnetic layer. The process of manufacturing coating liquids for forming the magnetic layer, nonmagnetic layer, and backcoat layer normally comprises at least a kneading step, dispersing step, and a mixing step, provided as needed before and/or after these steps. Each of these steps can be divided into two or more stages. All of the starting materials employed in an aspect of the present invention, such as the ferromagnetic powder, the crosslinkable polyester, nonmagnetic powder, binder, carbon black, abrasives, antistatic agents, lubricants, and solvents can be added either at the start of, or part way through, any step. Any of the starting materials can be divided up and added in two or more steps. For example, binder can be divided up and added in the kneading step, dispersing step, and in a kneading step after the dispersing step for viscosity adjustment. To manufacture the above magnetic recording medium, conventionally known manufacturing techniques can be employed. A device with powerful kneading strength such as an open kneader, continuous kneader, pressure kneader, extruder, or the like is desirably employed in the kneading step. These kneading treatments are described in Japanese Unexamined Patent Publication (KOKAI) Heisei Nos. 1-106338 and 1-79274, which are expressly incorporated herein by reference in their entirety. Glass beads or some other beads can be employed to disperse a composition for forming each layer. Dispersion beads of high specific gravity in the form of zirconia beads, titanium beads, or steel balls are suitable as such dispersion beads. These dispersion beads can be employed by optimizing their particle diameters and fill rates. A known dispersing apparatus can be employed.

After coating the magnetic layer-forming composition, various subsequent processing can be normally implemented, such as a drying treatment, orientation processing of the magnetic layer, and processing to smooth the surface (processing with a calender). The heat treatment of the magnetic layer-forming composition can be conducted at any stage subsequent to coating. In one embodiment, the crosslinking structure can be formed by heating in the drying treatment or calendering treatment. Such a heat treatment is desirably conducted at a heating temperature of 60 to 140° C. The term "heating temperature" refers to the temperature of the atmosphere in which the heat treatment is conducted, or to the temperature of the air when dry air is blown onto the surface of the coating of the magnetic layer-forming composition as a drying treatment. As a calender processing condition, the surface temperature of the calender rolls is, for example, 60 to 100° C., desirably 70 to 100° C., and more preferably, falls within a range of 80 to 100° C.

The magnetic recording medium that is obtained following the calender processing step can be heat treated to induce a crosslinking reaction. The heating temperature in such a heat treatment is, for example, 35 to 100° C., desirably 50 to 80° C.

The magnetic recording medium that has been obtained can be cut to desired size using a cutting machine, punch, or the like. Reference can be made to Japanese Unexamined Patent Publication (KOKAI) No. 2010-24113, paragraphs 0051 to 0057, for details regarding methods of manufacturing magnetic recording media.

In a magnetic recording medium according to an aspect of the present invention as set forth above, it is possible to improve the durability of the magnetic layer. Further, the magnetic recording medium can have a magnetic layer with a high degree of smoothness in which ferromagnetic powder is well dispersed. For example, a high degree of surface smoothness can be achieved in the form of a centerline average surface roughness Ra as measured by the method described in Examples further below that falls within a range of 1.0 to 5.0 nm. Thus, it becomes possible to provide a magnetic recording medium for high-density recording that affords good electromagnetic characteristics. The magnetic recording medium composition according to an aspect of the present invention can be suitably used to form such a magnetic layer.

EXAMPLES

Examples of the present invention will be specifically described below. However, the present invention is not limited to the embodiments shown in Examples. Unless specifically stated otherwise, the "parts" and "%" given below are values based on weight. The room temperature mentioned below is about 20 to 25° C.

The weight average molecular weights given below were determined by conducting measurement by GPC under the measuring conditions set forth above with the standard polystyrene conversion.

The fact that the compound targeted by the synthesis method set forth below was obtained was confirmed by $^1$H-NMR (nuclear magnetic resonance), GPC, and acid value measurement.

Further, the "internal temperatures" recorded below are the temperatures of the contents of the vessels (flasks and the like) that are described.

<Synthesis Examples of Precursors>

(Synthesis Example 1) Synthesis of Precursor 1

To a 500 mL three-necked flask were charged 197.2 g of ε-caprolactone and 11.3 g of furfuryl alcohol. While blowing in nitrogen, the mixture was stirred and dissolved at an internal temperature of 80° C. A 0.1 g quantity of monobutyltin oxide was added to the flask and the internal temperature was raised by heating to 100° C. After 8 hours, the disappearance of the starting materials was confirmed by gas chromatography, after which the contents were cooled to room temperature, yielding 200 g of Precursor 1 (with the structure indicated below) in the form of a solid.

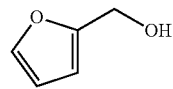

Chemical Formula: C$_5$H$_6$O$_2$
Molecular Weight: 98.10
Furfuryl alcohol

Precursor 1

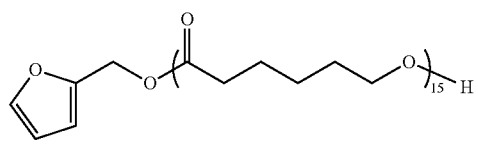

(Synthesis Example 2) Synthesis of Precursor 2

To a 500 mL three-necked flask were charged 197.2 g of ε-caprolactone and 16.3 g of N-(2-hydroxyethyl)maleimide. While blowing in nitrogen, the mixture was stirred and dissolved at an internal temperature of 80° C. A 0.1 g quantity of monobutyltin oxide was added to the flask and the internal temperature was raised by heating to 100° C. After 8 hours, the disappearance of the starting materials was confirmed by gas chromatography, after which the contents were cooled to room temperature, yielding 200 g of Precursor 2 (with the structure indicated below) in the form of a solid.

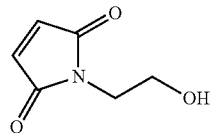

Chemical Formula: C$_6$H$_7$NO$_3$
Molecular Weight: 141.12
N-(2-Hydroxyethyl)maleimide Precursor 2

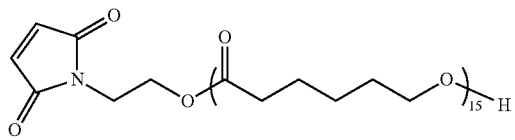

(Synthesis Example 3) Synthesis of Precursor 3

To a 500 mL three-necked flask were charged 197.2 g of ε-caprolactone and 13.4 g of 2-hydroxyethyl acrylate. While blowing in nitrogen, the mixture was stirred and dissolved at an internal temperature of 80° C. A 0.1 g quantity of monobutyltin oxide was added to the flask and the internal temperature was raised by heating to 100° C. After 8 hours, the disappearance of the starting materials was confirmed by gas chromatography, after which the contents were cooled to room temperature, yielding 200 g of Precursor 3 (with the structure indicated below) in the form of a solid.

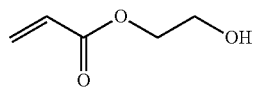

Chemical Formula: C$_5$H$_8$O$_3$
Molecular Weight: 116.12
2-Hydroxyethyl acrylate Precursor 3

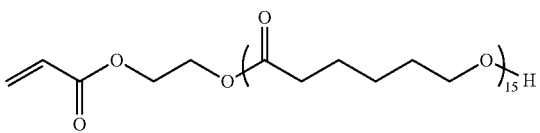

(Synthesis Example 4) Synthesis of Precursor 4

To a 500 mL three-necked flask were charged 197.2 g of ε-caprolactone and 27.9 g of methocarbamol. While blowing in nitrogen, the mixture was stirred and dissolved at an internal temperature of 80° C. A 0.1 g quantity of monobutyltin oxide was added to the flask and the internal temperature was raised by heating to 100° C. After 8 hours, the disappearance of the starting materials was confirmed by gas chromatography, after which the contents were cooled to room temperature, yielding 200 g of Precursor 4 (with the structure indicated below) in the form of a solid.

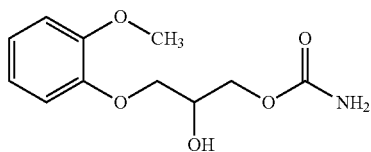

Chemical Formulal: $C_{11}H_{15}NO_5$
Molecular Weight: 241.24
Methocarbamol

Precursor 4

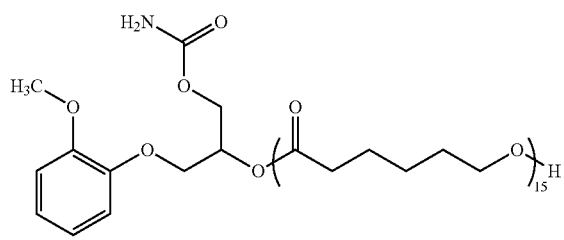

(Synthesis Example 5) Synthesis of Precursor 5

To a 500 mL three-necked flask were charged 197.2 g of ε-caprolactone and 17.0 g of 3-aminopropionaldehyde diethyl acetal. While blowing in nitrogen, the mixture was stirred and dissolved at an internal temperature of 80° C. A 0.1 g quantity of monobutyltin oxide was added to the flask and the internal temperature was raised by heating to 100° C. After 8 hours, the disappearance of the starting materials was confirmed by gas chromatography, after which the contents were cooled to room temperature, yielding 200 g of Precursor 5 (with the structure indicated below) in the form of a solid.

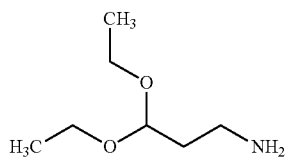

Chemical Formulal: $C_7H_{17}NO_2$
Molecular Weight: 147.22
3-Aminopropionaldehyde diethyl acetal Precursor 5

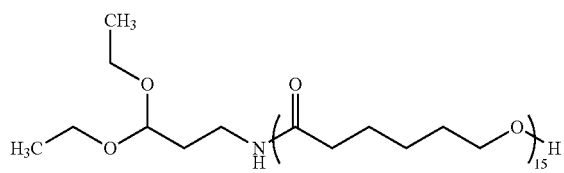

(Synthesis Example 6) Synthesis of Precursor 6

To a 500 mL three-necked flask were charged 197.2 g of ε-caprolactone and 15.0 g of 2-ethyl-1-hexanol. While blowing in nitrogen, the mixture was stirred and dissolved at an internal temperature of 80° C. A 0.1 g quantity of monobutyltin oxide was added to the flask and the internal temperature was raised by heating to 100° C. After 8 hours, the disappearance of the starting materials was confirmed by gas chromatography, after which the contents were cooled to room temperature, yielding 200 g of Precursor 6 (with the structure indicated below) in the form of a solid.

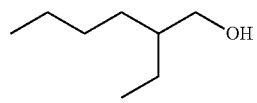

Chemical Formula: $C_8H_{18}O$
Molecular Weight: 130.23
2-Ethyl-1-hexanol

Precursor 6

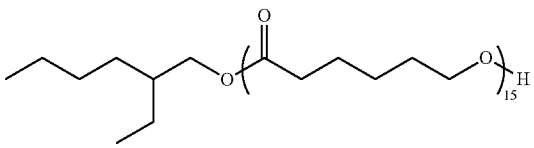

<Examples of Synthesis of the Crosslinkable Polyester>

(Synthesis Example 7) Synthesis of Polyester 1

To a 200 mL three-necked flask was charged 40.5 of Precursor 1. While blowing in nitrogen, the contents were stirred and dissolved at 80° C. To the flask was added 2.2 g of meso-butane-1,2,3,4-tetracarboxylic dianhydride and the internal temperature was raised to 110° C. by heating. After 5 hours, the disappearance of the starting materials was confirmed by $^1$H-NMR. The contents were then cooled to room temperature, yielding 38 g of Polyester 1 in the form of a solid.

(Synthesis Example 8) Synthesis of Polyester 2

With the exception that in Synthesis Example 7, the 2.2 g of meso-butane-1,2,3,4-tetracarboxylic dianhydride was replaced with 2.4 g of pyromellitic dianhydride, synthesis was conducted in the same manner as in Synthesis Example 7, yielding 38 g of Polyester 2 in the form of a solid.

(Synthesis Example 9) Synthesis of Polyester 3

With the exception that in Synthesis Example 7, the 2.2 g of meso-butane-1,2,3,4-tetracarboxylic dianhydride was replaced with 3.0 g of 2,3,6,7-naphthalenetetracarboxylic dianhydride, synthesis was conducted in the same manner as in Synthesis Example 7, yielding 39 g of Polyester 3 in the form of a solid.

(Synthesis Example 10) Synthesis of Polyester 4

With the exception that in Synthesis Example 7, the 2.2 g of meso-butane-1,2,3,4-tetracarboxylic dianhydride was replaced with 3.6 g of 3,3',4,4'-benzophenonetracarboxylic dianhydride, synthesis was conducted in the same manner as in Synthesis Example 7, yielding 40 g of Polyester 4 in the form of a solid.

(Synthesis Example 11) Synthesis of Polyester 5

With the exception that Precursor 1 (40.5 g) was replaced with Precursor 2 (40.7 g) in Synthesis Example 7, synthesis was conducted in the same manner as in Synthesis Example 7, yielding 38 g of Polyester 5 in the form of a solid.

(Synthesis Example 12) Synthesis of Polyester 6

With the exception that Precursor 1 (40.0 g) was replaced with Precursor 3 (39.8 g) in Synthesis Example 7, synthesis was conducted in the same manner as in Synthesis Example 7, yielding 37 g of Polyester 6 in the form of a solid.

(Synthesis Example 13) Synthesis of Polyester 7

With the exception that Precursor 1 (40.0 g) was replaced with Precursor 4 (40.3 g) in Synthesis Example 7, synthesis was conducted in the same manner as in Synthesis Example 7, yielding 37 g of Polyester 7 in the form of a solid.

(Synthesis Example 14) Synthesis of Polyester 8

With the exception that Precursor 1 (40.0 g) was replaced with Precursor 5 (37.7 g) in Synthesis Example 7, synthesis was conducted in the same manner as in Synthesis Example 7, yielding 37 g of Polyester 8 in the form of a solid.

(Synthesis Example 15) Synthesis of Polyester 9

With the exception that Precursor 1 (40.0 g) was replaced with Precursor 6 (39.6 g) in Synthesis Example 7, synthesis was conducted in the same manner as in Synthesis Example 7, yielding 37 g of Polyester 9 in the form of a solid.

Examples 1 to 9

<Preparation of Magnetic Layer-forming Composition (magnetic Recording Medium Composition)>
(Formula of Composition)

| | |
|---|---|
| Ferromagnetic plate-shaped hexagonal ferrite powder: Composition excluding oxygen (molar ratio): Ba/Fe/Co/Zn = 1/9/0.2/1 Coercive force Hc: 160 kA/m (2,000 Oe) Average particle size (average plate diameter): 20 nm Average plate ratio: 2.7 Specific surface area by BET method: 60 m$^2$/g Saturation magnetization σs: 46 A · m$^2$/kg (46 emu/g) | 100.0 parts |
| Crosslinkable polyester given in Table 1: | 10.0 parts |
| Polyurethane resin (Vylon (Japanese registered trademark) UR4800 made by Toyobo Co., Ltd., functional group: SO$_3$Na, functional group concentration: 70 eq/t, weight average molecular weight: 70,000): | 4.0 parts |
| Vinyl chloride resin (MR104 made by Kaneka Corp., weight average molecular weight 55,000): | 10.0 parts |
| α-Al$_2$O$_3$ (average particle size: 0.1 μm): | 8.0 parts |
| Carbon black (average particle size: 0.08 μm): | 0.5 part |
| Cyclohexanone: | 110.0 parts |

(Preparation of Composition)
The various above components were kneaded in an open kneader and then dispersed using a sand mill. The following components were added to the dispersion obtained and the mixture was stirred. The mixture was ultrasonically processed and then filtered using a filter having an average pore diameter of 1 μm, yielding a magnetic layer-forming composition (magnetic recording medium composition).
Butyl stearate: 1.5 parts
Stearic acid: 0.5 part
Amide stearate: 0.2 part
Methyl ethyl ketone: 50.0 parts
Cyclohexanone: 50.0 parts
Toluene: 3.0 parts
Crosslinking agent given in Table 1: See Table 1
Acid, base, or reaction initiator given in Table 1: See Table 1

Due to the effect of the base given in Table 1, the acryloyloxy group present in Polyester 6 contained in the magnetic layer-forming composition of Example 6 ionically reacted with the mercapto group present in the crosslinking agent given in Table 1, forming a crosslinking structure.

Due to the effect of the reaction initiator (azo-based radical initiator) given in Table 1, in Polyester 6 contained in the magnetic layer-forming composition of Example 7, the acryloyloxy groups present in Polyester 6 underwent a radical reaction, crosslinking the molecules of Polyester 6.

The acid f indicated in Table 1 removed the protection from the acetal groups present in Polyester 8 contained in the magnetic layer-forming composition of Example 9, producing aldehyde groups. These aldehyde groups underwent an ionic reaction with the hydroxyl groups present in the vinyl chloride resin (MR$^{104}$ made by Kaneka Corp.), forming a crosslinking structure.

(Preparation of Nonmagnetic Layer-Forming Composition)

| | |
|---|---|
| Nonmagnetic powder (αFe$_2$O$_3$ hematite): Average particle size (average major axis length): 0.15 μm Specific surface area by Brunauer-Emmett-Teller (BET) method: 52 m$^2$/g PH: 6 Tap density: 0.8 Dibutyl phthalate (DBP) oil absorption capacity: 27 to 38 g/100 g Surface treatment agents: Al$_2$O$_3$, SiO$_2$ | 80.0 parts |
| Carbon black: Average particle size: 0.020 μm DBP oil absorption capacity: 80 mL/100 g pH: 8.0 Specific surface area by BET method: 250 m$^2$/g Volatile component: 1.5% | 20.0 parts |
| Polyurethane resin: Branching side chain-containing polyester polyol/ diphenylmethane diisocyanate —SO$_3$Na = 100 eq/ton | 19.0 parts |
| Methyl ethyl ketone: | 150.0 parts |
| Cyclohexanone: | 150.0 parts |

The various above components were kneaded in an open kneader and then dispersed using a sand mill. The following components were added to the dispersion obtained and the mixture was stirred. The mixture was filtered using a filter having an average pore diameter of 1 μm to prepare a nonmagnetic layer-forming composition.

| | |
|---|---|
| Butyl stearate: | 1.5 parts |
| Stearic acid: | 1.0 part |
| Methyl ethyl ketone: | 50.0 parts |
| Cyclohexanone: | 50.0 parts |
| Toluene: | 3.0 parts |
| Polyisocyanate (Coronate 3041, made by Nippon Polyurethane Industry Co., Ltd.): | 5.0 parts |

(Preparation of Backcoat Layer-Forming Composition)

| | |
|---|---|
| Carbon black (average particle size: 40 nm): | 85.0 parts |
| Carbon black (average particle size: 100 nm): | 3.0 parts |
| Nitrocellulose: | 28.0 parts |
| Polyurethane resin: | 58.0 parts |
| Copper phthalocyanine dispersing agent: | 2.5 parts |
| Nipporan 2301 (made by Nippon Polyurethane Industry Co., Ltd.): | 0.5 part |
| Methyl isobutyl ketone: | 0.3 part |
| Methyl ethyl ketone: | 860.0 parts |
| Toluene: | 240.0 parts |

The above components were prekneaded in a roll mill and then dispersed in a sand mill. To the mixture were added 4.0 parts of polyester resin (Vylon 500 made by Toyobo Co., Ltd.) 14.0 parts of polyisocyanate (Coronate 3041 made by Nippon Polyurethane Industry Co., Ltd.), and 5.0 parts of α-Al₂O₃ (made by Sumitomo Chemicals). The mixture was stirred and filtered to prepare a back coat layer-forming composition.

(Fabrication of Magnetic Tape)

Both surfaces of a polyethylene naphthalate support 5.0 μm in thickness were corona discharge treated.

The above nonmagnetic layer-forming composition was coated in a manner calculated to yield a thickness of 1.0 μm upon drying on one of the surfaces of the polyethylene naphthalate support. Immediately thereafter, the magnetic layer-forming composition was simultaneously multilayer coated thereover in a manner calculated to yield a magnetic layer thickness upon drying of 100 nm. While the two layers were still wet, they were subjected to an orientation treatment with a cobalt magnet having a magnetic strength of 0.5 T (5,000 G) and a solenoid having a magnetic strength of 0.4 T (4,000 G) and then subjected to a drying treatment in a heated furnace at an atmospheric temperature of 140° C.

Subsequently, the above back coat layer-forming composition was coated in a manner calculated to yield a thickness upon drying of 0.5 μm on the other surface of the polyethylene naphthalate support. Next, a calendering treatment was conducted at a rate of 80 m/min at a calender roll surface temperature of 100° C. with a seven-stage calender comprised of metal rolls, and the product was slit to a width of ½ inch (0.0127 meter) to prepare a magnetic tape.

Comparative Example 1

With the exceptions that no crosslinkable polyester, acid, base, or reaction initiator was employed in the magnetic layer-forming composition, and 2.5 parts of polyisocyanate (Coronate 3041, made by Nippon Polyurethane Industry Co., Ltd.) were added instead of a crosslinking agent, a magnetic tape was fabricated by the same method as in the above Example.

Reference Example 1

With the exceptions that the polyester given in Table 1 was used without the above reactive group and no acid, base, or reaction initiator was used in the magnetic layer-forming composition, and that 2.5 parts of polyisocyanate (Coronate 3041 made by Nippon Polyurethane Industry Co., Ltd.) were added instead of a crosslinking agent, a magnetic tape was fabricated by the same method as in the above Example.

[Measurement Methods]

<Centerline Average Surface Roughness of Magnetic Layer Surface>

An atomic force microscope (AFM: Nanoscope III made by Digital Instrument Corp.) was employed to measure the centerline average surface roughness (Ra) of an area of 40 μm×40 μm on the surface of the magnetic layer in contact mode.

<Electromagnetic Characteristics: Signal-to-Noise Ratio (S/N Ratio)

A linear-tape-open (LTO) Generation 4 (Gen 4) drive was employed to record signals at linear recording densities of 172 kfci and 86 kfci with a recording track width of 11.5 μm and a reproduction track width of 5.3 μm. The reproduction signal was frequency analyzed with a spectrum analyzer. The ratio of the output of the carrier signal when the 172 kfci signal was recorded to the integrated noise of the full spectral bandwidth when the 86 kfci signal was recorded was adopted as the S/N ratio. An LTO-Gen4 tape made by Fujifilm was employed as a reference tape. The S/N ratio of the reference tape was adopted as 0 dB and the S/N ratios of the various magnetic tapes were calculated as relative values. A S/N ratio of greater than or equal to 0 dB was determined to indicate good electromagnetic characteristics as a magnetic recording medium for high-density recording.

<Durability of the Magnetic Layer (Shaving of the Surface of the Magnetic Layer)>

A magnetic tape was passed at an angle of 150 degrees so as to cause the surface of the magnetic layer to contact the edge of a square bar made of Al₂O₃/TiC having a 7 mm×7 mm cross-section. A magnetic tape 100 m in length was slid one pass under conditions of a load of 100 g and a speed of 6 m/s, the edge of the square bar was observed under an optical microscope, and the state of matter adhered was evaluated. An organoleptic evaluation was conducted on a 10-level scale. A 10 indicated the least adhered matter and a 1 indicated the most adhered matter.

The adhered matter that was evaluated by the above method was mainly the result of shaving of the surface of the magnetic layer. The lower the value of the evaluation result, the greater the shaving of the surface of the magnetic layer and the poorer the durability of the magnetic layer indicated. An evaluation score of greater than or equal to 8 was determined to indicate little adhered matter (shaving of the surface of the magnetic layer) and good durability of the magnetic layer. An evaluation score of greater than or equal to 9 was determined to indicate particularly good magnetic layer durability.

The results are given in Table 2 below.

TABLE 1

Magnetic layer-forming composition (magnetic recording medium composition)
Polyester

| Example 1 | Polyester 1 |
|---|---|

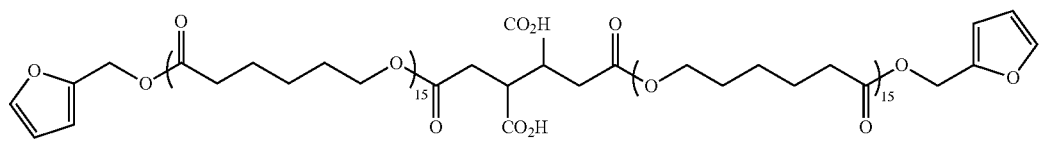

Weight average molecular weight: 7200

TABLE 1-continued
Example 2
Polyester 2
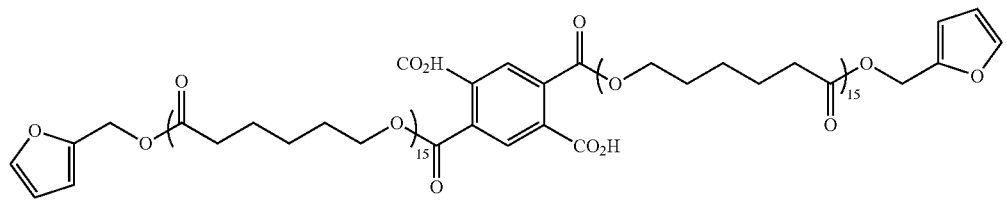
Weight average molecular weight: 6500
Example 3
Polyester 3
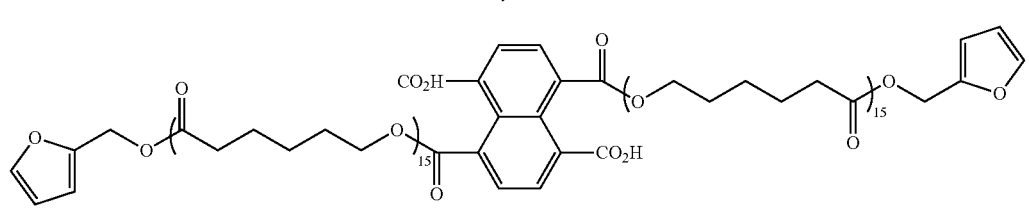
Weight average molecular weight: 5800
Example 4
Polyester 4
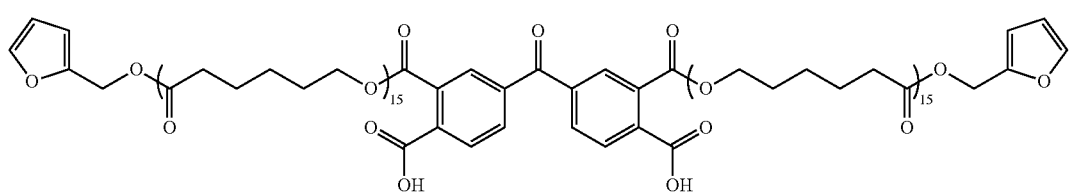
Weight average molecular weight: 7000
Example 5
Polyester 5
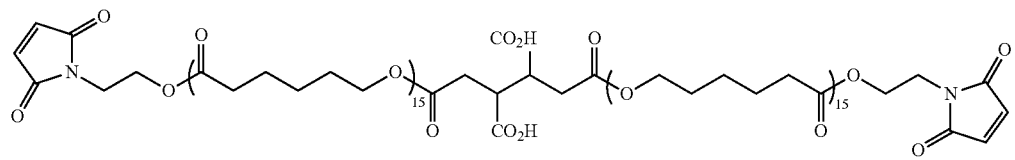
Weight average molecular weight: 7800
Example 6
Polyester 6
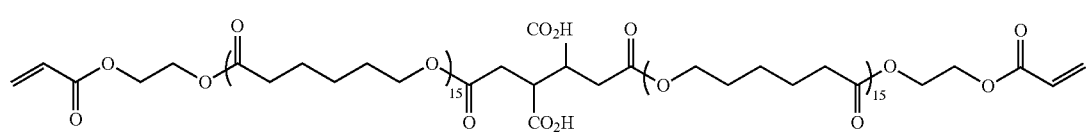
Weight average molecular weight: 8400
Example 7
Polyester 7
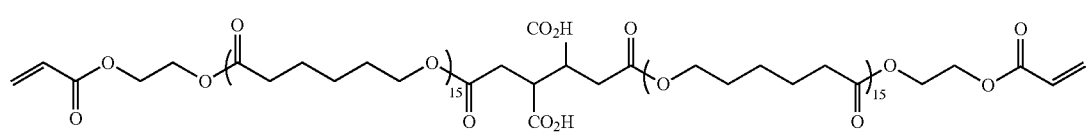
Weight average molecular weight: 8400

TABLE 1-continued

Example 8 — Polyester 7

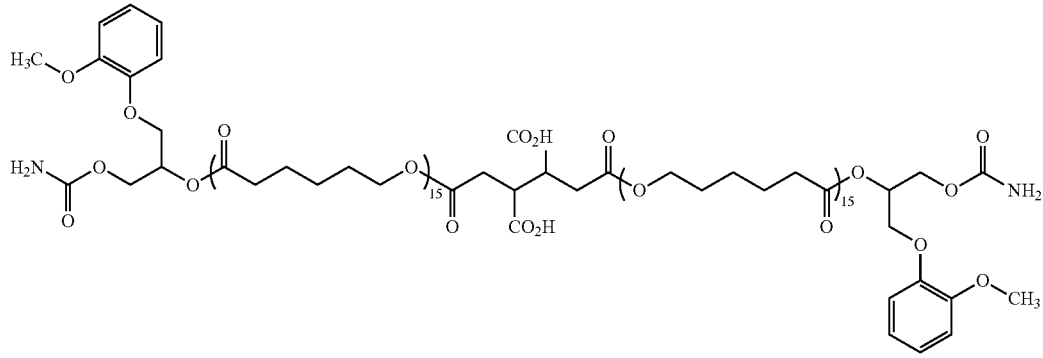

Weight average molecular weight: 6200

Example 9 — Polyester 8

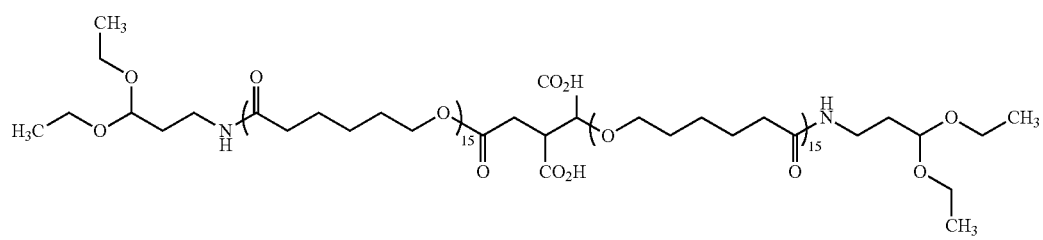

Weight average molecular weight: 8000

Comp. Ex. 1 — None

Ref. Ex. 1 — Polyester 9

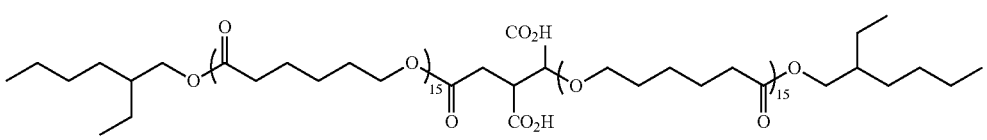

Weight average molecular weight: 6200

| | Magnetic layer-forming composition (magnetic recording medium composition) | | | |
|---|---|---|---|---|
| | Crosslinking agent | Crosslinkable binder | Acid, base, or reaction initiator | Polyisocyanate |
| Example 1 | a (2.5 parts) | None | None | None |
| Example 2 | a (2.5 parts) | None | None | None |
| Example 3 | a (2.5 parts) | None | None | None |
| Example 4 | a (2.5 parts) | None | None | None |
| Example 5 | b (2.5 parts) | None | None | None |
| Example 6 | c (2.5 parts) | None | Base DBU (diazabicyclo undecene) (0.1 part) | None |
| Example 7 | None | None | Reaction initiator d (0.1 part) | None |
| Example 8 | e (2.5 parts) | None | None | None |

TABLE 1-continued

| | | | | |
|---|---|---|---|---|
| Example 9 | None | Vinyl chloride resin (MR104 made by Kaneka Corp.) (10.0 parts) | Acid f (0.1 part) | None |
| Comp. Ex. 1 | None | None | None | g (2.5 parts) |
| Ref. Ex. 1 | None | None | None | g (2.5 parts) |

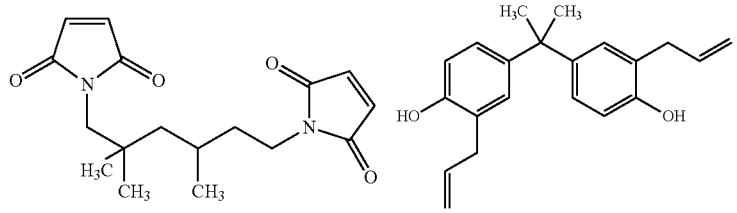

Molecular Weight: 318.37
a)

Molecular Weight: 308.41
b)

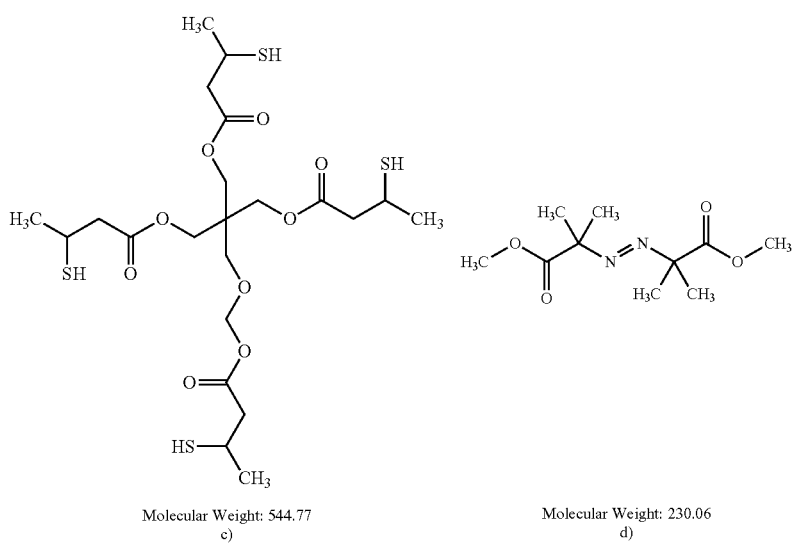

Molecular Weight: 544.77
c)

Molecular Weight: 230.06
d)

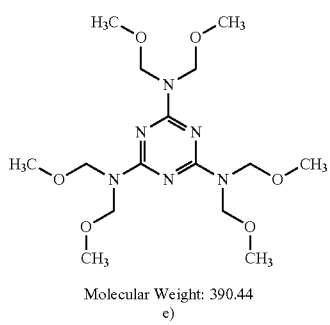

Molecular Weight: 390.44
e)

a) 1,1'-(2,2,4-Trimethylhexane-1,6-diyl)bis(1H-pyrrole-2,5-dione) (BMI-TMH made by Daiwa Kasei Industry Co., Ltd.)
b) 2,2'-Diallybisphenol A (DABPA made by Daiwa Kasei Industry Co., Ltd.)
c) Pentaerythritol tetrakis(3-mercaptobutyrate) (Karenz MT made by Showa Denko K.K.)
d) 2,2'-Azobis(methyl isobutyrate) (V-601, made by Wako Pure Chemical Industries, Ltd.)
e) Methylated melamine resin (MW-390 made by Sanwa Chemical)
f) p-Toluene-4-sulfonic acid
g) Polyisocyanate (Coronate 3041 made by Nippon Polyurethane Industry Co., Ltd.)

TABLE 2

|  | Dispersibility | | Durability of magnetic layer Shaving of surface of magnetic layer (poor) 1 to 10 (good) |
|---|---|---|---|
|  | Centerline average surface roughness Ra (nm) of surface of magnetic layer | S/N ratio (dB) | |
| Example 1 | 4.0 | 1.0 | 10 |
| Example 2 | 4.5 | 1.0 | 9 |
| Example 3 | 4.5 | 1.0 | 9 |
| Example 4 | 4.6 | 1.0 | 9 |
| Example 5 | 4.1 | 1.0 | 10 |
| Example 6 | 4.2 | 1.0 | 9 |
| Example 7 | 4.4 | 1.0 | 10 |
| Example 8 | 4.3 | 1.0 | 10 |
| Example 9 | 4.2 | 1.0 | 10 |
| Comp. Ex. 1 | 5.2 | 0 | 2 |
| Ref. Ex. 1 | 4.2 | 1.0 | 8 |

Evaluation Results

Based on the results given in Table 2, the magnetic tapes of Examples were determined to exhibit high magnetic layer surface smoothness and good durability. The tapes of Examples 1 and 5 to 9, obtained using an acid anhydride in the form of meso-butane-1,2,3,4-tetracarboxylic dianhydride and employing the crosslinkable polyester with the above partial structure as a magnetic layer component exhibited particularly good results.

By contrast, the magnetic tape of Comparative Example 1, fabricated without employing crosslinkable polyester as a magnetic layer component, exhibited poor surface smoothness and durability in the magnetic layer.

The magnetic tape of Reference Example 1 was fabricated using polyester having an acidic group and having a weight average molecular weight falling within a range of 1,000 to 20,000 (but without the above reactive group) as a magnetic layer component instead of the crosslinkable polyester. Based on comparison of Examples and Reference Example 1, the use of the crosslinkable polyester as a magnetic layer component and the formation of a crosslinking structure by means of the crosslinkable polyester were determined to yield better magnetic layer durability (an evaluation score of greater than or equal to 9).

An aspect of the present invention can be useful in the field of manufacturing particulate magnetic recording media.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. A composition,
which is a magnetic recording medium composition, and comprises:
ferromagnetic powder,
binder, and
a crosslinkable component selected from the group consisting of a component capable of forming a crosslinking structure by a radical reaction, a component capable of forming a crosslinking structure by an ionic reaction, and a component capable of forming a crosslinking structure by a pericyclic reaction,
wherein the crosslinkable component comprises at least polyester,
the polyester has a weight average molecular weight ranging from 1,000 to 20,000, as well as comprises, per molecule, one or more acidic groups, and one or more reactive groups selected from the group consisting of a radical reactive group, an ionic reactive group, and a pericyclic reactive group, and
the polyester is selected from polyesters denoted by the following Formula 2:

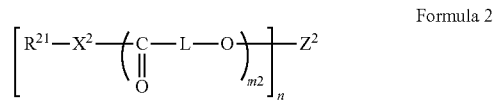

Formula 2 wherein, in Formula 2, $R^{21}$ denotes the reactive group, $X^2$ denotes —O—, —S—, or —$NR^{22}$—, $R^{22}$ denotes a hydrogen atom or a monovalent group, L denotes a divalent connecting group, $Z^2$ denotes a partial structure of valence n comprising at least one acidic group, m2 denotes an integer of 2 to 60, and n denotes an integer of 2 to 4, and wherein the divalent connecting group, L, comprises an alkylene group having 1-12 carbon atoms.

2. The composition according to claim 1, wherein the crosslinkable component comprises the component capable of forming a crosslinking structure by a radical reaction.

3. The composition according to claim 1, wherein the crosslinkable component comprises the component capable of forming a crosslinking structure by an ionic reaction.

4. The composition according to claim 1, wherein the crosslinkable component comprises the component capable of forming a crosslinking structure by a pericyclic reaction.

5. The composition according to claim 1, wherein the polyester comprises two or more of the reactive groups per molecule.

6. The composition according to claim 1, wherein the crosslinkable component further comprises a compound comprising, per molecule, two or more groups capable of crosslinking with the reactive group present in the crosslinkable polyester.

7. The composition according to claim 6, wherein the compound has a molecular weight ranging from 100 to 5,000.

8. The composition according to claim 6, wherein the compound comprises, per molecule, 3 to 8 of the groups capable of crosslinking with the reactive group present in the polyester.

9. The composition according to claim 1, wherein the crosslinkable component comprises binder comprising, per molecule, one or more groups capable of crosslinking with the reactive group present in the polyester.

10. The composition according to claim 1, wherein the polyester comprises one or more radical reactive groups per molecule selected from the group consisting of a (meth)acrylic group, a (meth)acryloyloxy group, a styryl groups, a vinyl group, and an allyl group.

11. The composition according to claim 1, wherein the polyester comprises one or more ion reactive groups selected from the group consisting of a carbamate group, a hydroxyl group, a mercapto group, an aldehyde group, an acetal group, an epoxy group, a (meth)acrylic group, a (meth)acryloyloxy group, a methylol group, a methoxymethyl group, a styryl group, a maleimide group, and an amino group.

12. The composition according to claim 1, wherein the polyester comprises one or more pericyclic reactive groups selected from the group consisting of a conjugated diene-containing group and a double bond-containing group.

13. The composition according to claim 12, wherein the double bond-containing group is a maleimide group.

14. The composition according to claim 1, wherein the polyester comprises an acidic group selected from the group consisting of a carboxyl group and a carboxyl salt.

15. The composition according to claim 1, wherein the polyester comprises at least two acidic groups, with two adjacent carbon atoms in which each of the two adjacent carbon atoms is bonded to one acidic group.

16. The composition according to claim 1, wherein the polyester comprises the following partial structure:

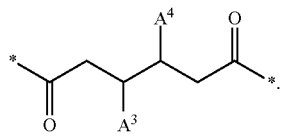

wherein, in the partial structure, each of $A^3$ and $A^4$ independently denotes an acidic group, and * denotes a position of a bond with another structure constituting the polyester.

17. The composition according to claim 16, wherein * in the partial structure denotes a position of a bond with a polyester chain contained in the polyester.

18. The composition according to claim 1, wherein an average particle size of the ferromagnetic powder is greater than or equal to 10 nm but less than or equal to 50 nm.

19. A method of manufacturing a magnetic recording medium, wherein the magnetic recording medium comprises a magnetic layer on a nonmagnetic support, and the method comprises forming the magnetic layer through a step of heating the composition according to claim 1.

20. The composition according to claim 1, wherein "n" in Formula 2 is equal to 2.

* * * * *